United States Patent [19]
Terao et al.

[11] Patent Number: 5,967,626
[45] Date of Patent: Oct. 19, 1999

[54] BRAKING SYSTEM FOR AUTOMOTIVE VEHICLE

[75] Inventors: Hidenori Terao, Nagouya; Mamoru Sawada, Yokkaichi, both of Japan

[73] Assignee: Denso Corporation, Kariya, Japan

[21] Appl. No.: 08/847,608

[22] Filed: Apr. 25, 1997

[30] Foreign Application Priority Data

| Apr. 25, 1996 | [JP] | Japan | 8-105931 |
| Apr. 25, 1996 | [JP] | Japan | 8-105932 |
| Jul. 15, 1996 | [JP] | Japan | 8-185096 |

[51] Int. Cl.⁶ .................................................. B60T 8/40
[52] U.S. Cl. .................... 303/116.2; 303/122.01; 188/1.11 R
[58] Field of Search ................. 188/1.11 R, 1.11 E; 303/122.01, 116.1, 116.2, 113.4

[56] References Cited

U.S. PATENT DOCUMENTS

| 4,708,225 | 11/1987 | Feldman et al. | 188/1.11 E |
| 5,004,301 | 4/1991 | Yamada et al. | |
| 5,058,961 | 10/1991 | Mergenthaler et al. | |

FOREIGN PATENT DOCUMENTS

| 60-175899 | 9/1985 | Japan . |
| 63-270270 | 11/1988 | Japan . |
| 1-289748 | 11/1989 | Japan . |
| 2-095956 | 4/1990 | Japan . |
| 2-102858 | 4/1990 | Japan . |
| 3-054054 | 3/1991 | Japan . |
| 5-162626 | 6/1993 | Japan . |
| 5-262216 | 10/1993 | Japan . |
| 5-286429 | 11/1993 | Japan . |
| 6-227378 | 8/1994 | Japan . |

*Primary Examiner*—Robert J. Oberleitner
*Assistant Examiner*—Robert A. Siconolfi
*Attorney, Agent, or Firm*—Pillsbury madison & Sutro LLP

[57] ABSTRACT

A braking system for automotive vehicles is provided which is designed to minimize the kickback produced in a brake master cylinder and transmitted to a vehicle operator through a brake pedal during braking control or to inform the vehicle operator of generation of the kickback in advance for alleviating the discomfort due to the kickback. The braking system includes a pressure regulating valve which restricts transmission of a pressure variation to the master cylinder from a hydraulic braking circuit during the braking control to reduce the kickback. The braking system may alternatively include a pressure-reducing valve which reduces the hydraulic pressure within the brake master cylinder to decrease a hydraulic reaction force against the pedal effort provided by the vehicle operator when a wheel is approaching or has reached a road-tire adhesion limit for warning the vehicle operator of generation of the kickback in advance.

4 Claims, 22 Drawing Sheets

WHEEL CYLINDER

BRAKING SYSTEM FOR AUTOMOTIVE VEHICLE

BACKGROUND OF THE INVENTION

1. Technical Field

The present invention relates generally to a braking system for automotive vehicles designed to regulate the braking pressure acting on wheels for optimizing braking conditions, and more particularly to a braking system having a function of returning the brake pressure exerted on wheels back to a driver-operated braking pressure source when decreasing the braking pressure acting on the wheels.

2. Background of Related Art

Braking systems for automotive vehicles are known in the art which regulate the braking pressure supplied to wheel cylinders for optimizing the braking force during braking. In general, such braking systems are classified into a type wherein the braking pressure is returned back to a pressure reservoir when decreasing the braking pressure and a type wherein the brake fluid is recirculated by a pump back to a master cylinder.

The latter type has the advantage over the former type of having no lack of the brake fluid, however, encounters the drawback in that the brake fluid is returned back to the master cylinder each time the pressure of the brake fluid is decreased during depression of a brake pedal by a driver, thereby causing great pressure vibrations to be produced in the master cylinder which are transmitted as a reaction force (generally called kickback), with which the driver feel uncomfortable, against depression of the brake pedal, which may preclude further depression of the brake pedal.

SUMMARY OF THE INVENTION

It is therefore a principal object of the present invention to avoid the disadvantages of the prior art.

It is another object of the present invention to provide a braking system for automotive vehicles designed to minimize the kickback transmitted to a vehicle operator through a brake pedal during braking pressure control.

It is a further object of the present invention to provide a braking system for automotive vehicles designed to inform a vehicle operator of generation of the kickback in advance for minimizing the discomfort of the vehicle operator due to the kickback.

According to one aspect of the present invention, there is provided a braking system for an automotive vehicle which comprises: (a) an operating member pressed by a vehicle operator for applying a braking effort to a wheel; (b) a hydraulic braking pressure generating means for generating a hydraulic braking pressure according to a pressing effort provided by the vehicle operator to the operating member; (c) a braking force generating means for generating a braking force acting on a wheel of the vehicle in response to the hydraulic braking pressure provided from the hydraulic braking pressure generating means; (d) a hydraulic pressure line connecting the hydraulic braking pressure generating means and the braking force generating means, the hydraulic pressure line including a supply line for supplying the hydraulic braking pressure provided by the hydraulic braking pressure generating means to the braking force generating means and a return line for returning the hydraulic braking pressure provided through the pressure supply line to the hydraulic braking pressure generating means; (e) a pressure regulating mechanism disposed within the supply line, regulating the hydraulic braking pressure provided to the braking force generating means to control the braking force acting on the wheel, the pressure regulating mechanism operating at least in a pressure-reducing mode in which the hydraulic braking pressure provided to the braking force generating means is reduced by draining the hydraulic braking pressure from the supply line into the return line; (f) a pressure delivering mechanism disposed within the return line, delivering the hydraulic braking pressure drained into the return line to a portion of the hydraulic pressure line between the hydraulic braking pressure generating means and the pressure regulating mechanism; and (g) a pressure variation reducing means for reducing a pressure variation caused by the hydraulic braking pressure delivered by the pressure delivering mechanism, transmitted to the hydraulic braking pressure generating means.

In the preferred mode of the invention, the pressure variation reducing means restricts hydraulic communication between the hydraulic braking pressure generating means and the pressure delivering mechanism.

The pressure variation reducing means may block transmission of the pressure variation within a given pressure level range to the hydraulic braking pressure generating means when the pressure delivering mechanism is operating.

The pressure variation reducing means may produce a given pressure difference between a first portion of the hydraulic pressure line connecting the pressure variation reducing means and the hydraulic braking pressure generating means and a second portion of the hydraulic pressure line connecting the pressure delivering mechanism and the pressure variation reducing means.

The pressure variation reducing means may dampen at a damping given rate the hydraulic braking pressure transmitted from the pressure delivering mechanism to the hydraulic braking pressure generating means.

The pressure variation reducing means may block hydraulic communication between the hydraulic braking pressure generating means and the pressure delivering mechanism when the pressure delivering mechanism is operating.

The pressure variation reducing means may include a pressure control valve having a first valve position establishing fluid communication between the hydraulic braking pressure generating means and the pressure delivering mechanism and a second valve position restricting the fluid communication between the hydraulic braking pressure generating means and the pressure delivering mechanism so as to produce the given pressure difference between the first portion and the second portion of the hydraulic pressure line. The pressure variation reducing means assumes the second valve position when the pressure delivering mechanism is operating to deliver the hydraulic braking pressure.

The pressure variation reducing means is switched from the second valve position to the first valve position a given period of time after completion of reduction in hydraulic braking pressure provided the braking force generating means through the pressure reducing mechanism.

The hydraulic pressure line is filled with a brake fluid. The given period of time may be determined based on one of a duration of the reduction in hydraulic braking pressure provided from the pressure increasing mechanism to the braking force generating means through the pressure reducing mechanism and an estimated amount of the brake fluid reduced in pressure by the pressure reducing mechanism.

When the hydraulic braking pressure provided by the hydraulic braking pressure generating means is reduced below a given level, the pressure variation reducing means establishes fluid communication between the pressure delivering mechanism and the hydraulic braking pressure generating means so that the hydraulic braking pressures upstream and downstream of the pressure variation become equal to each other.

The hydraulic braking pressure acting on the braking force generating means is increased above that outputted from the hydraulic braking pressure generating means by activities of the pressure variation reducing means and the pressure delivering mechanism.

A second braking force generating means is further provided for generating a braking force acting on a second wheel of the vehicle according to the hydraulic braking pressure provided from the hydraulic braking pressure generating means. When the pressure variation reducing means reduces the pressure variation, the pressure delivering mechanism deliveries the hydraulic braking pressure drained into the return line to the portion of the hydraulic pressure line for increasing the hydraulic braking pressure provided from the hydraulic braking pressure generating means to the second braking force generating means.

According to another aspect of the invention, there is provided a braking system for an automotive vehicle which comprises: (a) an operating member pressed by a vehicle operator for applying a braking effort to a wheel; (b) a hydraulic braking pressure generating means for generating a hydraulic braking pressure according to a pressing effort provided by the vehicle operator to the operating member; (c) a braking force generating means for generating a braking force acting on a wheel of the vehicle according to the hydraulic braking pressure provided from the hydraulic braking pressure generating means; (d) a hydraulic pressure line connecting the hydraulic braking pressure generating means and the braking force generating means; (e) a braking condition determining circuit determining whether or not the wheel lies within a given friction limit range including a limit of friction between a road surface and the wheel at which the wheel rotates on the road surface without skidding; and (f) a warning circuit reducing a hydraulic reaction force produced in the hydraulic braking pressure generating means against the pressing effort provided to the operating member by the vehicle operator for warning the vehicle operator of proximity to the limit of the friction when the braking condition determining circuit determines that the wheel lies within the given friction limit range.

In the preferred mode of the invention, a pressure regulating mechanism is disposed within the hydraulic pressure line which operates to regulate the hydraulic braking pressure provided to the braking force generating means for controlling the braking force acting on the wheel according to a braking condition of the wheel. The warning circuit warns the vehicle operator of the proximity to the limit of the friction when the pressure regulating mechanism operates.

The warning circuit drains the hydraulic braking pressure out of the hydraulic pressure line to reduce the hydraulic reaction force against the braking effort provided by the vehicle operator.

A reservoir is further provided which stores therein the hydraulic braking pressure drained out of the hydraulic pressure line to reduce the hydraulic reaction force against the braking effort provided by the vehicle operator.

The pressure regulating mechanism may include a pressure rise-controlling valve which is actuated to transmit the hydraulic braking pressure provided from the hydraulic braking pressure generating means to the braking force generating means and a pressure reducing valve which is actuated to drain the hydraulic braking pressure out of the hydraulic pressure line into the reservoir. The warning circuit actuates the pressure reducing valve to reduce the hydraulic reaction force against the braking effort provided by the vehicle operator.

A differential pressure regulating mechanism and a pressure amplifying mechanism may be provided. The differential pressure regulating means is disposed between a first portion of the hydraulic pressure line connecting with the hydraulic braking pressure generating means and a second portion of the hydraulic pressure line connecting with the braking force generating means and produces a pressure difference between the first and second portions of the hydraulic pressure line so that hydraulic pressure within in the second portion is higher than that within the first portion. The pressure amplifying mechanism is actuated to drain the brake fluid out of the first portion of the hydraulic pressure line and deliveries the drained brake fluid to the second portion of the hydraulic pressure line to amplify the hydraulic braking pressure in the second portion. The warning circuit actuates the pressure amplifying mechanism to reduce the hydraulic reaction force produced in the hydraulic braking pressure generating means against the braking effort provided by the vehicle operator.

A second braking force generating is further provided for generating a braking force acting on a second wheel of the vehicle according to hydraulic braking pressure provided thereto. The pressure amplifying mechanism is actuated to delivery the drained brake fluid to the second portion of the hydraulic pressure line to increase the hydraulic braking pressure acting on the second braking force.

The determination of whether the wheel lies within the given friction limit range or not may be made based on a slippage of the wheel.

According to a further aspect of the invention, there is provided a braking system for an automotive vehicle which comprises: (a) an operating member pressed by a vehicle operator for applying a braking effort to a wheel; (b) a hydraulic braking pressure generating means for generating a hydraulic braking pressure according to a pressing effort provided by the vehicle operator to the operating member; (c) a braking force generating means for generating a braking force acting on a wheel of the vehicle according to the hydraulic braking pressure provided from the hydraulic braking pressure generating means; and (d) an informing circuit changing a hydraulic reaction force produced in the hydraulic braking pressure generating means against the pressing effort provided to the operating member by the vehicle operator for informing the vehicle operator of a braking condition of the vehicle.

In the preferred mode of the invention, the informing circuit informs the vehicle operator that the wheel is within a given friction limit range including a limit of friction between a road surface and the wheel at which the wheel rotates on the road surface without skidding.

The informing circuit determines whether the pressing effort provided by the vehicle operator to the operating member is too great to produce an optimum braking force through the braking force generating means or not and reduces the hydraulic reaction force produced in the hydraulic braking pressure generating means when it is determined that the pressing effort is too great to produce the optimum braking force.

The determination made by the informing circuit may be based on a slippage of the wheel.

The determination made by the informing circuit may alternatively be based on a cumulative value of slippages determined in a given sampling cycle.

The determination made by the informing circuit may alternatively be based on the hydraulic braking pressure in the hydraulic braking pressure generating means.

The determination made by the informing circuit may alternatively be based on the hydraulic braking pressure acting on the braking force generating means.

The informing circuit decreases the hydraulic braking pressure provided in the hydraulic braking pressure generating means to reduce the hydraulic reaction force.

The informing circuit may alternatively increase the hydraulic braking pressure provided in the hydraulic braking pressure generating means to change the hydraulic reaction force.

The hydraulic braking pressure generating means communicates hydraulically with the braking force generating means when the informing means changes the hydraulic reaction force produced in the hydraulic braking pressure generating means.

According to a further aspect of the invention, there is provided a braking system for an automotive vehicle which comprises: (a) a brake pedal; (b) a hydraulic braking pressure generating means for generating a hydraulic braking pressure according to a pedal effort provided by the vehicle operator to the brake pedal; (c) a braking force generating means for generating a braking force acting on a wheel of the vehicle according to the hydraulic braking pressure provided from the hydraulic braking pressure generating means; (d) a first line connecting the hydraulic braking pressure generating means and the braking force generating means; (e) a storing means for storing therein a brake fluid within the first line; (f) a second line connected at one end to the first line and at the other end to the storing means; (g) a pressure regulating valve disposed within the second line to selectively block and establish fluid communication between the first line and the storing means; (h) a determining means for determining whether the brake effort provided by the vehicle operator is too great to produce an optimum braking force through the braking force generating means or not; and (i) a controlling means for controlling the pressure regulating valve to establish the fluid communication between the first line and the storing means when the determining means determines that the brake effort provided by the vehicle operator is too great to produce the optimum braking force through the braking force generating means.

In the preferred mode of the invention, a second regulating valve is provided which selectively establishes and blocks fluid communication between a junction of the first and second lines and the braking force generating means. A second controlling means is provided for controlling the second regulating valve to block the fluid communication between the junction and the braking force generating means when the regulating valve establish the fluid communication between the first line and the storing means.

A proportional control valve may be disposed between the junction of the first and second lines and the braking force generating means to hold the hydraulic braking pressure on a side of the braking force generating means higher than that on a side of the junction of the first and second lines.

A pump means may be provided for pumping the brake fluid out of the storing means into the first line.

An antiskid brake control system may be provided for regulating the hydraulic braking pressure acting on the braking force generating means to optimize a braking effort acting on the wheel.

According to a still further aspect of the invention, there is provided a braking system for an automotive vehicle which comprises: (a) an operating member pressed by a vehicle operator for applying a braking effort to a wheel; (b) a hydraulic braking pressure generating means for generating a hydraulic braking pressure according to a pressing effort provided by the vehicle operator to the operating member; (c) a braking force generating means for generating a braking force acting on a wheel of the vehicle in response to the hydraulic braking pressure; (d) a hydraulic pressure line filled with a brake fluid, connecting the hydraulic braking pressure generating means and the braking force generating means, the hydraulic pressure line including a supply line for supplying the hydraulic braking pressure provided by the hydraulic braking pressure generating means to the braking force generating means and a return line for returning the hydraulic braking pressure provided through the pressure supply line to the hydraulic braking pressure generating means; (e) a pressure regulating mechanism disposed within the supply line, regulating the hydraulic braking pressure provided to the braking force generating means to control the braking force acting on the wheel, the pressure regulating mechanism operating at least in a pressure-reducing mode in which the hydraulic braking pressure provided to the braking force generating means is reduced by draining the brake fluid from the supply line into the return line; (f) a pressure delivering mechanism disposed within the return line, delivering the brake fluid drained into the return line to a portion of the hydraulic pressure line between the hydraulic braking pressure generating means and the pressure regulating mechanism; (g) a fluid flow inhibiting means for inhibiting flow of the brake fluid from the pressure delivering mechanism to the hydraulic braking pressure generating means when the pressure delivering mechanism delivers the brake fluid to the portion of the hydraulic pressure line; (h) a braking condition determining circuit determining whether or not the wheel lies within a given friction limit range including a limit of friction between a road surface and the wheel at which the wheel rotates on the road surface without skidding; and (i) a warning circuit changing a hydraulic reaction force produced in the hydraulic braking pressure generating means against the pressing effort provided to the operating member by the vehicle operator for warning the vehicle operator of proximity to the limit of the friction when the braking condition determining circuit determines that the wheel lies within the given friction limit range.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
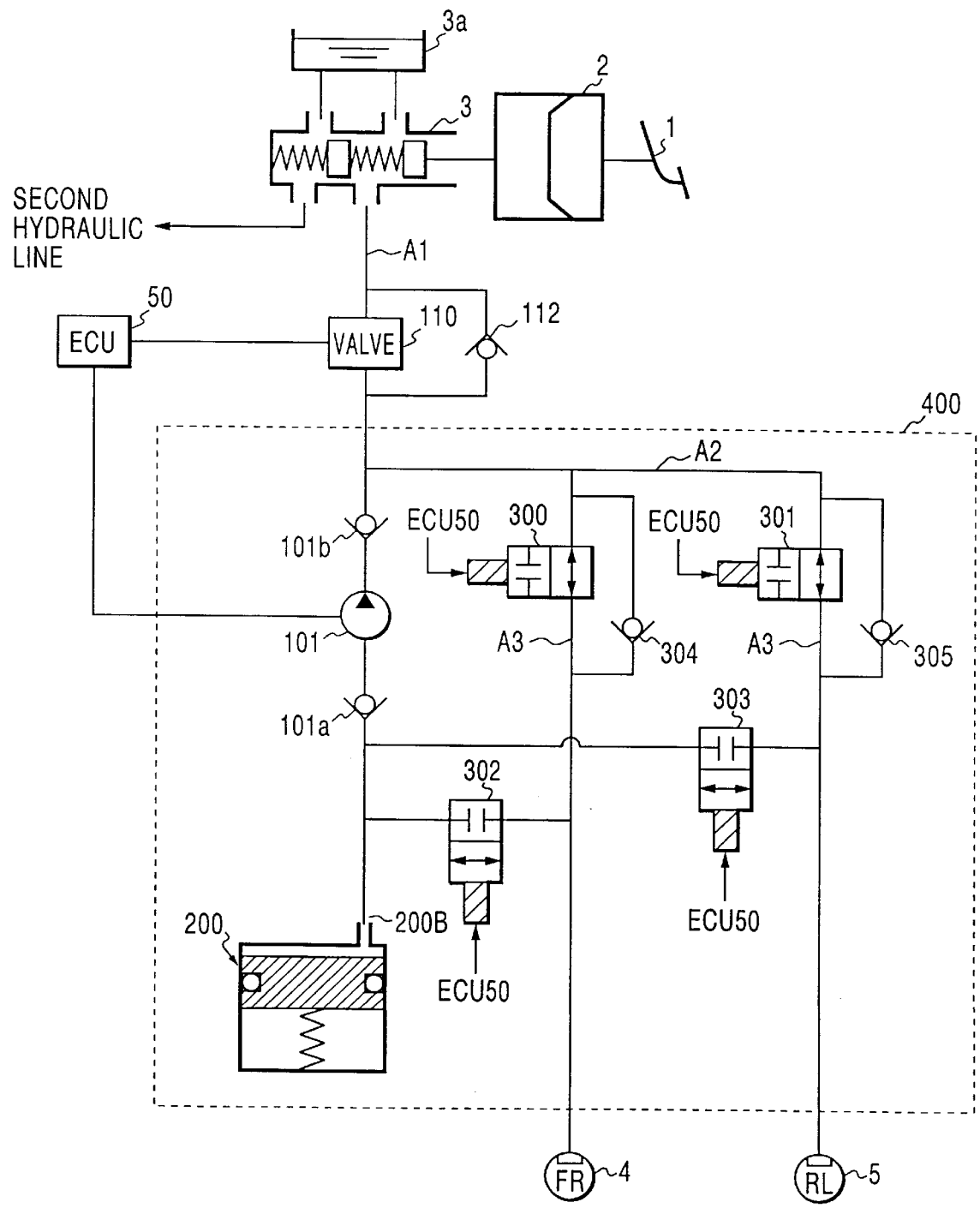
FIG. 1 is a hydraulic circuit diagram which shows a braking system according to the first embodiment of the invention.

Referring now to the drawings, wherein like reference numbers refer to like parts throughout several views, particularly to FIG. 1, there is shown a braking system for automotive vehicles according to the first embodiment of the invention which is installed in a front drive four-wheel vehicle equipped with the so-called X type dual circuit (also referred to as a diagonal dual circuit) consisting of a front right-rear left hydraulic line (referred to as a first hydraulic line hereinafter) for controlling braking forces acting on front right and rear left wheels and a front left-rear right hydraulic line (referred to as a second hydraulic line hereinafter) for controlling braking forces acting on front left and rear right wheels.

The first hydraulic line has disposed therein a hydraulic system consisting of a master cut valve 110 and an antiskid hydraulic system 400 controlled by an electronic control unit (ECU) 50. The second hydraulic line also has the same hydraulic system controlled by the ECU 50 according to the same braking control program as that of the hydraulic system in the first hydraulic line which will be discussed later in detail. All embodiments as discussed below will refer only to the structure and operation of the hydraulic system in the first hydraulic line for the sake of simplicity of disclosure.

The braking system includes generally a booster 2 connected to a brake pedal 1, the master cylinder 3, the master cut valve 110, the antiskid hydraulic system 400, and the ECU 50.

When the brake pedal 1 is depressed by a vehicle operator, it is transmitted to the booster 2. The booster 2 includes two pressure chambers: an atmospheric chamber and a vacuum chamber. The vacuum chamber producing therein the negative pressure using, for example, an intake manifold vacuum or a vacuum pump. The booster 2 doubles a pedal effort applied by the vehicle operator to the brake pedal 1 or a pedal stroke using the difference in pressure between the atmospheric chamber and the vacuum chamber and transmits it to the master cylinder 3 through a push rod. The push rod presses a piston of the master cylinder 3 to produce the master cylinder pressure PU. The master cylinder 3 communicates with a master reservoir 3a from which a brake fluid is supplied to the master cylinder 3 and which stores therein an excess of the brake fluid within the master cylinder 3.

The master cylinder pressure PU is transmitted to first and second wheel cylinders 4 and 5 through the master cut valve 110 and the antiskid hydraulic system 400.

Figure 2A:
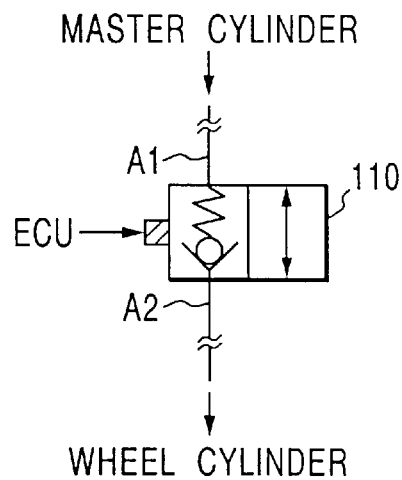
FIG. 2(a) is an illustration which shows a structure of a master cut valve.
Figure 2B:
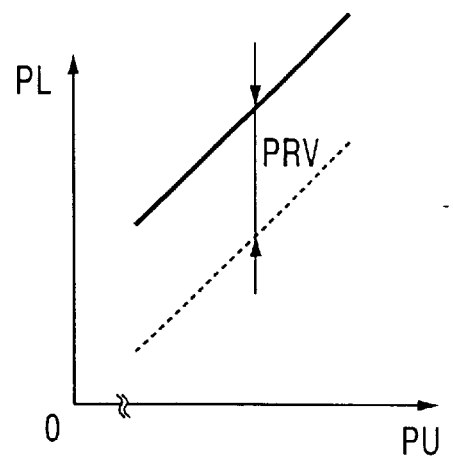
FIG. 2(b) is a graph which shows a pressure difference produced by the master cut valve of FIG. 2(a) between upstream and downstream lines thereof.

The master cut valve 110 has, as shown in FIG. 2(a), first and second valve positions which are switched by the ECU 50. The master cut valve 110 is normally turned off to assume the first valve position to establish direct fluid communication between the first and second lines A1 and A2 so that the hydraulic pressures in the first and second lines A1 and A2 will be equal to each other, as shown by a broken line in FIG. 2(b). In the second valve position, the master cut valve 110 operates as a differential pressure regulating valve to produce a pressure difference PRV between the first and second lines A1 and A2 so that the hydraulic pressure within the second line A2 (referred to as a second brake pressure PL hereinafter) will be, as shown in FIG. 2(b), held higher than the master cylinder pressure (first brake pressure) PU.

Figure 8:
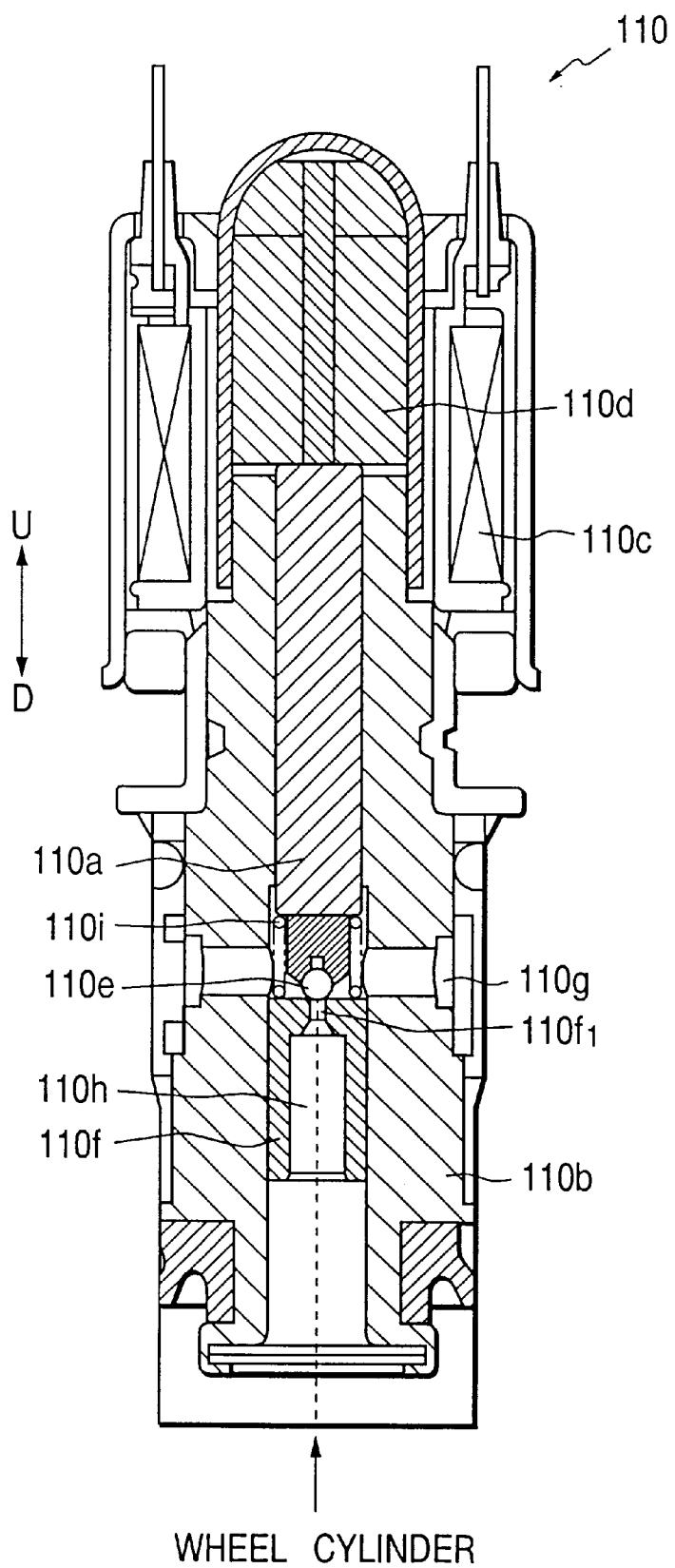
FIG. 8 is a cross sectional view which shows a structure of a master cut valve.

The master cut valve 110 is, as shown in FIG. 8, a solenoid-operated control valve which includes a shaft 110a, a guide 110b, a coil 110c, a plunger 110d, a ball 110e, a seat cylinder 110f, and a spring 110i. The shaft 110a is disposed within the guide 110b slidably in longitudinal directions U and D. The plunger 110d is connected to an end portion of the shaft 110a and moves the shaft 110a when the coil 110c is energized. The ball 110e is secured in the tip of the shaft 110a and brought into engagement with and out of an orifice 110f1 formed in the seat cylinder 110f according to the movement of the shaft 110a for controlling fluid communication between the first and second lines A1 and A2. The spring 110i urges the shaft in the direction U.

The master cut cylinder 3 is, as described above, normally in the first valve position. Specifically, the coil 110c is in an off state so that the ball 110e is urged in the direction U by the spring 110i to open the orifice 110f1. When the coil is energized, it produces the attraction force urging the shaft 110a in the direction D against the spring force of the spring 110i so that the ball 110e is brought into engagement with the orifice 110f1 to establish the second valve position. When the pressure rise within the second line A2 exceeds the pressure difference PRV that is determined by a spring constant of the spring 110i, it lifts up the ball 110e against the spring force of the spring 110i to open the orifice 110f1 so that the master cylinder pressure PU is increased according to an increase in the second brake pressure PL with the pressure difference PRV.

A check valve 112 is, as shown in FIG. 1, arranged in parallel to the master cut cylinder 110 which allows the brake fluid to pass therethrough from the master cylinder 3 to the wheel cylinders 4 and 5 when the pedal effort provided by the vehicle operator exceeds a given level. Specifically, the check valve 112 ensures the supply of the master cylinder pressure PU produced by the pedal effort above the given level to the wheel cylinders 4 and 5 even if the master cut valve 101 fails so that it is held in the second valve position or a pump 101 malfunctions.

The antiskid hydraulic system 400 includes, as shown in FIG. 1, a first pressure rise-controlling valve 300 for controlling an increase in hydraulic braking pressure supplied to the first wheel cylinder 4 and a second pressure rise-controlling valve 301 for controlling an increase in hydraulic braking pressure supplied to the second wheel cylinder 5. The first and second pressure rise-controlling valves 300 and 301 each include a solenoid-operated two position valve designed to selectively establish and block fluid communication between inlet and outlet ports thereof. When the braking system is not in the antiskid brake control, that is, when the braking system is in a normal brake mode, the first and second pressure rise-controlling valves 300 and 301 are both held off by the ECU 50 to establish fluid communication between the inlet and outlet ports thereof for transmitting the master cylinder pressure PU or the hydraulic braking pressure outputted from the pump 101 to the wheel cylinders 4 and 5.

Check valves 304 and 305 are arranged in parallel to the first and second pressure rise-controlling valves 300 and 301, respectively, for preventing excessive brake pressure from acting on the wheel cylinders 4 and 5.

The antiskid hydraulic system 400 also includes first and second pressure-reducing valves 302 and 303 each including a solenoid-operated two position valve. The first and second pressure-reducing valves 302 and 303 are turned on by the ECU 50 to establish fluid communication between the wheel cylinders 4 and 5 and an inlet 200B of a brake fluid reservoir 200, respectively. When the braking system is in the normal brake mode, the first and second pressure-reducing valves 302 and 303 are held off to block the fluid communication between the wheel cylinders 4 and 5 and the brake fluid reservoir 200.

The pump 101 is connected through a check valve 101b to the inlet ports of the first and second pressure rise-controlling valves 300 and 301 and through a check valve 101b to outlet ports of the first and second pressure-reducing valves 302 and 303. The pump 101 is turned on by the ECU 50 to pump the brake fluid out of a line between the first and second pressure-reducing valves 302 and 303 and the brake fluid reservoir 200 into the second line A2 between the master cut valve 110 and the first and second pressure rise-controlling valves 300 and 301.

Figure 3:
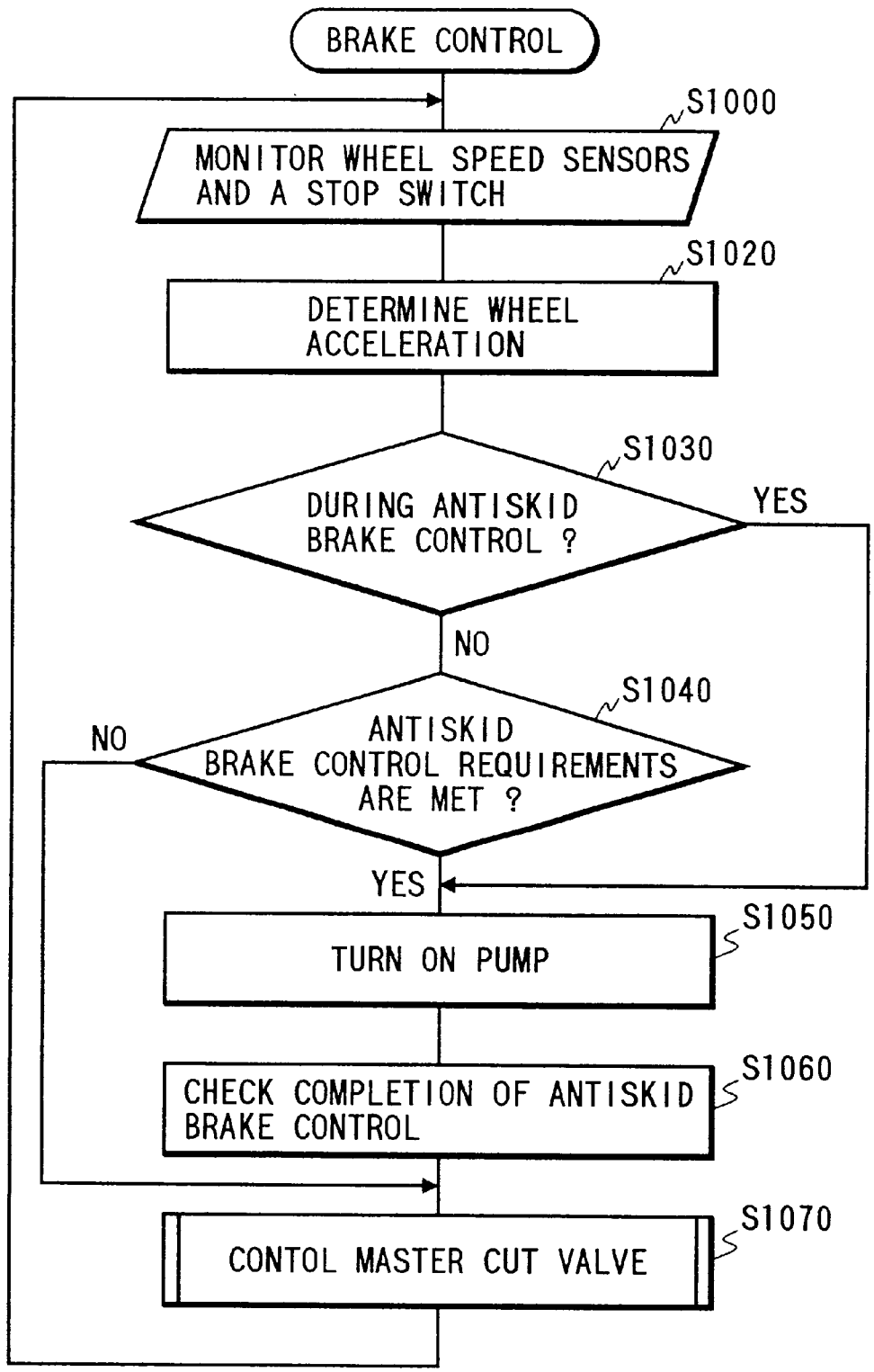
FIG. 3 is a flowchart of a braking control program performed by the braking system of FIG. 1.
Figure 4:
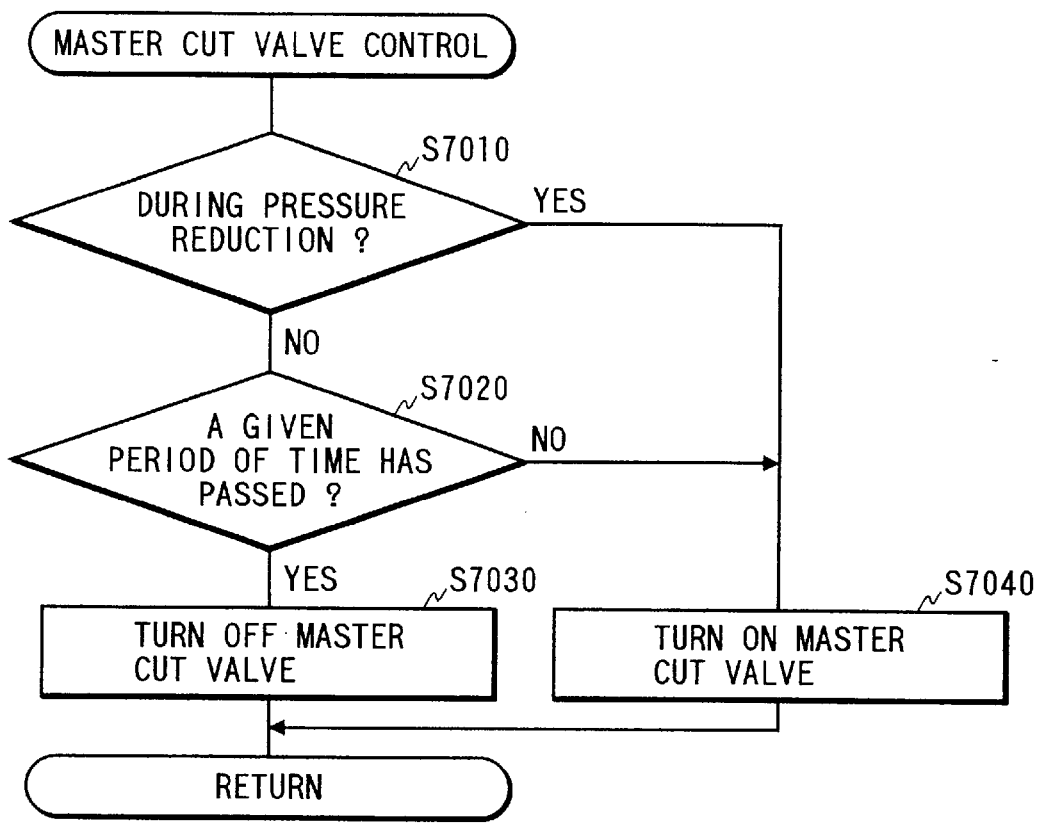
FIG. 4 is a flowchart of a master cut valve control program.
Figure 5:
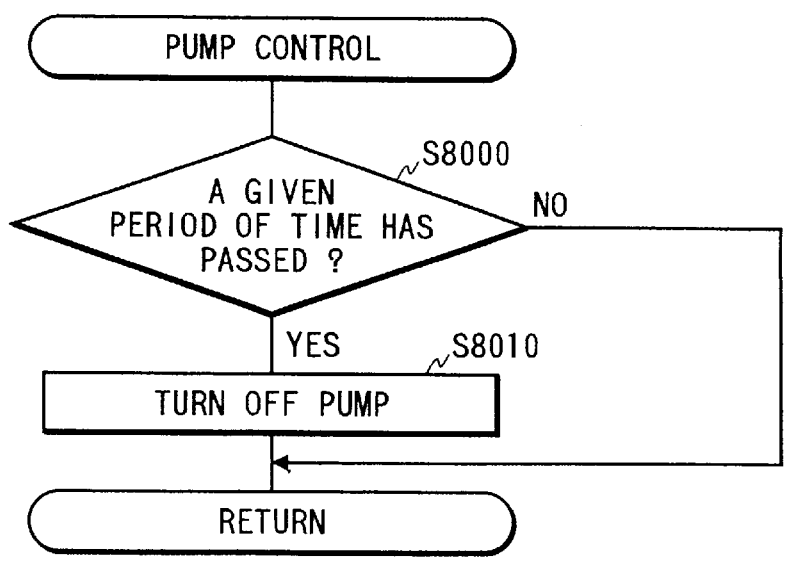
FIG. 5 is a flowchart of a pump control program.

FIGS. 3 to 5 show flowcharts of programs for brake control performed by the ECU 50.

Upon entering the program shown in FIG. 3, the routine proceeds to step 1000 wherein wheel speed sensors and a stop switch of the brake pedal 1 (both not shown) are monitored. The stop switch outputs an ON-signal in response to depression of the brake pedal 1.

The routine proceeds to step 1020 wherein wheel accelerations of both the wheels are determined based on data derived by the wheel speed sensors.

The routine proceeds to step 1030 wherein it is determined whether the braking system is in an antiskid brake control mode or not by monitoring a control flag. If a NO answer is obtained meaning that the braking system is not in the antiskid brake control mode, then the routine proceeds to step 1040 wherein it is determined whether given antiskid brake control requirements are met or not. If a NO answer is obtained, then the routine proceeds directly to step 1070 and enters a master cut valve control program as shown in FIG. 4.

First, in step 7010, it is determined whether there is one or more wheel whose applied hydraulic braking pressure is being decreased or not. If a YES answer is obtained, then the routine proceeds to step 7040 wherein the master cut valve 110 is turned on to function as the differential pressure regulating valve.

Alternatively, if a NO answer is obtained meaning that there is no wheel whose applied hydraulic braking pressure is being decreased, then the routine proceeds to step 7020 wherein it is determined whether or not a given period of time has elapsed after reduction in hydraulic braking pressure applied to both wheels is completed. If a NO answer is obtained, then the routine proceeds to step 7040 wherein the master cut valve 110 is maintained on.

Alternatively, if a YES answer is obtained in step 7020, then the routine proceeds to step 7030 wherein the master cut valve 110 is turned off to establish the fluid communication between the first and second lines A1 and A2.

Usually, when the braking system (i.e., the first hydraulic line) is not in the antiskid brake control mode, the negative answer is obtained in step 7010, while the positive answer is obtained in step 7020. The master cut valve 110 is thus held off.

When the brake pedal 1 is depressed by the vehicle operator, and it is determined that either or both of the wheels are approaching or has reached a road-tire adhesion limit (i.e., a limit of a coefficient of friction between road surface and tire at which the wheel rotates on the road surface without skidding) based on the wheel accelerations derived in step 1020, the antiskid brake control requirements are met. Thus, a YES answer is obtained in step 1040 of FIG. 3, and the routine proceeds to step 1050 wherein the pump 101 is turned on to initiate the antiskid brake control as will be described later in detail. In brief, rotation of the wheels is monitored, and the hydraulic braking pressures acting on the wheel cylinders 4 and 5 are regulated for optimizing the braking forces acting on the wheels, respectively. Subsequently, the routine proceeds to step 1060 wherein it is determined the antiskid brake control has been completed or not, as will be discussed later in detail. The routine is then returned back to step 1000 through step 1070.

Figure 6:
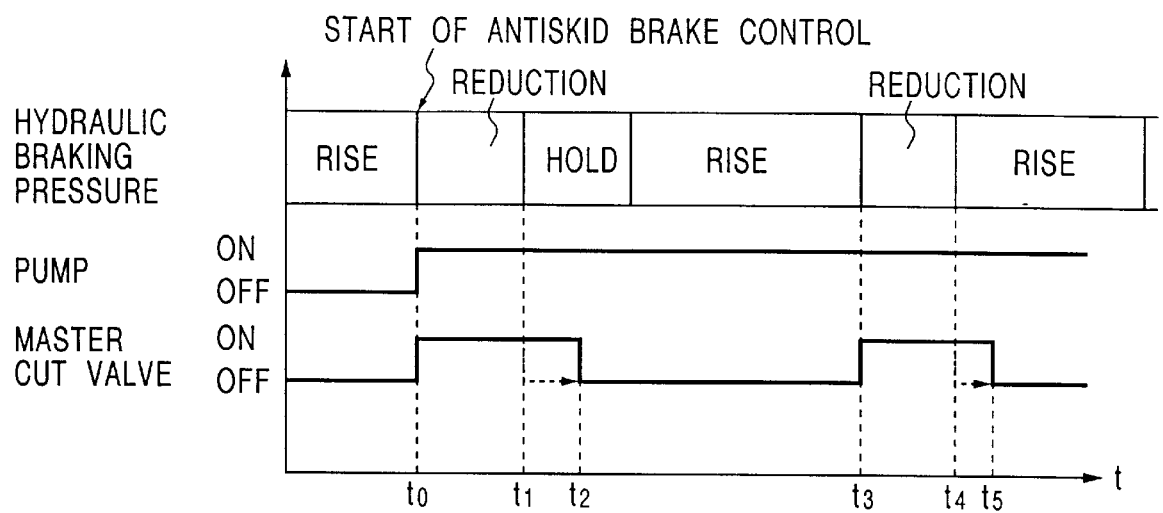
FIG. 6 is a time chart which shows the relation between hydraulic braking pressure and operations of a pump and a master cut valve.

FIG. 6 shows a time chart of a hydraulic braking pressure control operation. In the following discussion, it is assumed that the antiskid brake control is initiated at a time t0 to regulate the hydraulic braking pressure acting on the front right wheel (i.e., wheel cylinder 4), for example.

At the time t0, the pressure rise-controlling valve 300 is closed, while the pressure-reducing valve 302 is opened to reduce the hydraulic braking pressure acting on the wheel cylinder 4. At a time t1, the pressure rise-controlling valve 300 and the pressure-reducing valve 302 are both closed to hold the hydraulic braking pressure in the wheel cylinder 4 according to the behavoir of the wheel or the wheel acceleration derived in step 1020. Subsequently, the pressure rise-controlling valve 300 is cyclically opened on in a pulse fashion to increase the hydraulic braking pressure in the wheel cylinder 4. After a time t3, a sequence of the above operations: the pressure-reducing operation, the pressure holding operation, and the pressure increasing operation is repeated to optimize the braking effort acting on the wheel.

The pump 101 is turned on at the time t0 to pump the brake fluid within the line extending between the brake fluid reservoir 200 and the pressure rise-controlling valves 300 and 301 into the line A2 for compensating for lack of the brake fluid in the master cylinder 3.

During the period for which the hydraulic braking pressure is cyclically increased and the period for which the hydraulic braking pressure is held, the pressure-reducing valve 302 (and the pressure-reducing valve 303) is closed, thereby preventing the pump 101 from pumping out the brake fluid. Thus, a great increase in pressure does not take place between the master cut valve 110 and the pressure rise-controlling valve 300. Specifically, the kickback does not occur even if the master cut valve 110 is opened.

However, during the periods of the hydraulic braking pressure reduction (i.e., time t0 to t1, time t3 to t4, . . . ), the pressure-reducing valve 302 is held opened. The pump 101 delivers the brake fluid into the line A2 so that the pressure between the master cut valve 110 and the pressure rise-controlling valve 300 is greatly increased, which will cause the kickback to occur in the master cylinder 3.

For avoiding the above drawback, the master cut valve 110 is, as already discussed in FIG. 4, turned on when the pressure-reducing valve 302 is opened (i.e., at time t0, t3, . . . ) to operate as the differential pressure regulating valve for restricting the fluid flow from the line A2 to the line A1. This minimizes pressure variations in the line A1, thereby avoiding the kickback with which the vehicle operator feels uncomfortable.

Figure 7:
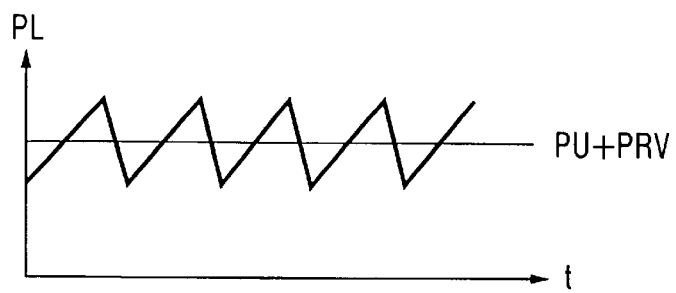
FIG. 7 is a graph which shows a variation in pressure downstream of a master cut valve.

Specifically, when the master cut valve 110 is turned on to operate as the differential pressure regulating valve, it blocks the fluid flow from the line A2 to the line A1 when the second brake pressure PL is lower than the sum of the master cylinder pressure PU and the pressure difference PRV and allows the fluid flow from the line A2 to the line A1 when the second brake pressure PL exceeds the sum of the master cylinder pressure PU and the pressure difference PRV. Therefore, if the second brake pressure PL in the line A2 fluctuates, as shown in FIG. 7, under the antiskid brake control, the master cut valve 110 allows only portions of the pressure fluctuation over the sum of the master cylinder pressure PU and the pressure difference PRV (PU+PRV) to be transmitted to the master cylinder 3. This minimizes the kickback transmitted to the vehicle operator through the brake pedal 1.

The pressure difference PRV may be increased greatly to restrict the pressure within the line A2 from increasing over the sum of PU and PRV during the antiskid brake control. This prevents the pressure within the line A2 from being transmitted to the master cylinder 3, thus avoiding the kickback completely. In this case, the master cut valve 110 may be replaced with a typical shutoff valve blocking the fluid communication between the lines A1 and A2 completely when turned on during the antiskid brake control.

The master cut valve 110, as described above in step 7030 of FIG. 4 and clearly shown in FIG. 6, is opened after a lapse of the given period of time (time t1 to t2 or time t4 to t5) following completion of reduction in hydraulic braking pressure. This is for avoiding the kickback due to discharge of the brake fluid from the pump 101 after the pressure-reducing valve 302 is closed. This lag time (time t1 to t2 or time t4 to t5) is preferably determined based on the length of time the hydraulic braking pressure is decreased (time t0 to t1 or time t3 to t4) or an estimated amount of brake fluid to be decreased in pressure.

If a YES answer is obtained in step 1060 meaning that the antiskid brake control has been completed, then the routine in a subsequent program cycle proceeds directly to step 1070 after a NO answer is obtained in step 1040. Ultimately, the master cut valve 110 is turned off or opened in step 7030 so that the second brake pressure PL becomes equal to the master cylinder pressure PU.

Additionally, if the YES answer is obtained in step 1060, a pump off program, as shown in FIG. 5, is initiated.

First, in step 8000, it is determined whether a given period of time has elapsed after the antiskid brake control is finished or not. If a YES answer is obtained, then the routine proceeds to step 8010 wherein the pump 101 is turned off.

As apparent form the above discussion, when the front right wheel is under the antiskid brake control while the rear left wheel is not under the antiskid brake control, the hydraulic braking pressure increased above that in the master cylinder 3 by the pump 101 is transmitted through the pressure rise-controlling valve 301 to the wheel cylinder 5 during a time when the master cut valve 110 operates as the differential pressure regulating valve, thereby increasing the braking effort acting on the rear left wheel.

Figure 9A:
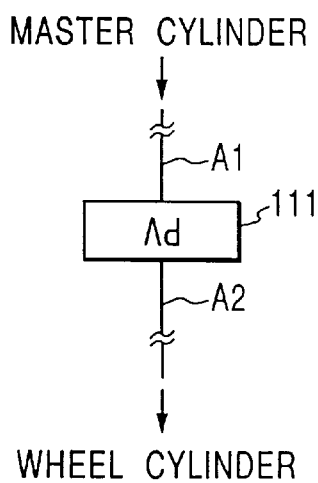
FIG. 9(a) is an illustration which shows a structure of a proportional control valve used in a brake system according to the second embodiment of the invention.

FIG. 9(a) shows a braking system according to the second embodiment of the invention which uses a proportional control valve 111 instead of the master cut valve 110 and the check valve 112. The proportional control valve 111, unlike the master cut valve 110, is not controlled by the ECU 50, but operates mechanically.

The proportional control valve 111 is, as clearly shown in FIG. 9(a), oriented in reverse. Specifically, the proportional control valve 111 so operates that, when the brake fluid flows in a forward direction (i.e., from the line A2 to the line A1), the pressure of the brake fluid in the line A2 is transmitted to the line A1 at a given damping rate. In practice, when the second brake pressure PL in the line A2 is, as shown in FIG. 9(b), increased above a set pressure P1 of the proportional control valve 111 by the activity of the pump 101, the second brake pressure PL in the line A2 is transmitted to the line A1 at a damping rate, as indicated by an inclination of a solid line.

Therefore, if the master cylinder pressure PU in the line A1 is defined as a reference pressure, the second brake pressure PL in the line A2 may be viewed as being amplified by the pump 101 and held in a relation of the reciprocal of the above damping rate. In other words, even if the second brake pressure PL is undesirably increased by the pump 101, an increase in the master cylinder pressure PU is adjusted appropriately, thereby preventing a stroke of the brake pedal 1 from being increased and a pedal reaction force from being eliminated, which would be caused by a great reduction in the master cylinder pressure PU.

The reduction in pedal effort provided by the vehicle operator causes the master cylinder pressure PU to drop, the proportional control valve 111 decreasing the second brake pressure PL. The braking effort intended by the vehicle operator is thus applied to the wheels.

Figure 9B:
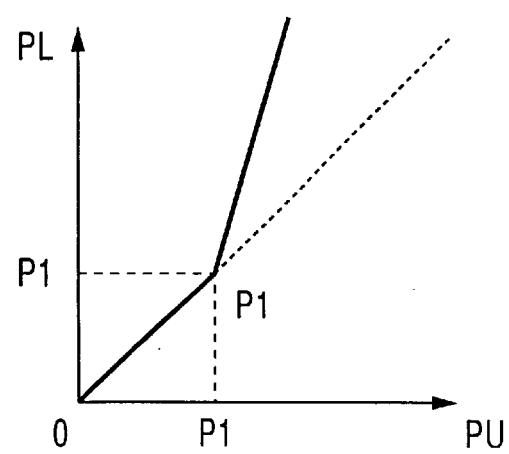
FIG. 9(b) is a graph which shows a pressure difference produced by the proportional control valve of FIG. 9(a)

When the second brake pressure PL is, as shown in FIG. 9(b), less than the set pressure P1 of the proportional control valve 111, the second brake pressure PL is exposed through the proportional control valve 111 to the master cylinder pressure PU, so that no pressure difference is produced between the lines A1 and A2 (i.e., PL=PU). Similarly, when the master cylinder pressure PU is less than the set pressure P1, the second brake pressure PL will be equal to the master cylinder pressure PU through the proportional control valve 111.

Therefore, the timing with which the second brake pressure PL supplied to the wheel cylinders 4 and 5 is increased after the master cylinder pressure PU reaches a given level, may be controlled by changing the set pressure P1 of the proportional control valve 111. For example, when the set pressure P1 is zero (0), the second brake pressure PL becomes higher than the master cylinder pressure PU immediately after the pump 101 is turned on, thereby producing a pressure difference between the second brake pressure PL and the master cylinder pressure PU.

When the brake fluid flows in a reverse direction (i.e., from the line A1 to the line A2), the pressure of the brake fluid in the line A1 (i.e., the master cylinder pressure PU) is transmitted to the line A2 without being damped. Thus, even if the pump 101 fails to increase the pressure in the line A2, at least the master cylinder pressure PU is transmitted to the wheel cylinders 4 and 5.

The proportional control valve 111 may be a known load sensing proportioning valve. The use of the load sensing proportional valve allows the amplitude of the hydraulic braking pressure to be changed according to the payload.

Figure 10:
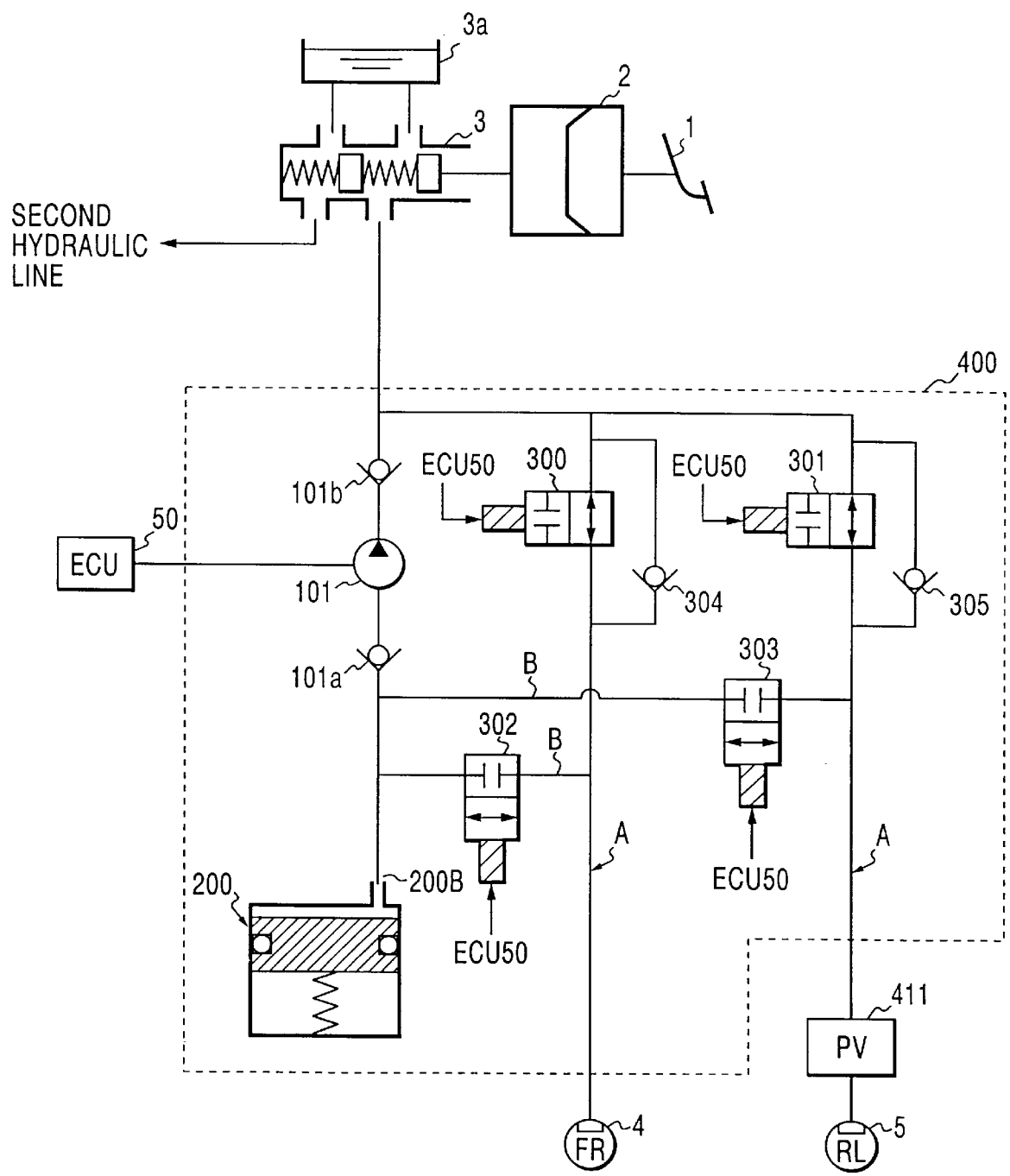
FIG. 10 is a hydraulic circuit diagram which shows a braking system according to the third embodiment of the invention.

FIG. 10 shows a braking system according to the third embodiment of the invention. The same reference numbers as employed in the first embodiment refer to the same parts, and explanation thereof in detail will be omitted here.

The braking system of this embodiment is, as can be seen in the drawing, different from the first embodiment only in that the master cylinder 3 is connected directly to the check valve 110a of the antiskid hydraulic system 400, and a proportional control valve 411 is disposed between the pressure rise-controlling valve 301 and the wheel cylinder 5 for the rear left wheel. Other arrangements are identical.

The proportional control valve 411, like the one shown in FIG. 9(a), transmits the hydraulic pressure increased by the pressure rise-controlling valve 301 to the wheel cylinder 5 at a given damping rate to send the vehicle into a skid at the front right wheel prior to the rear left wheel for ensuring the stability of the vehicle.

Figure 11:
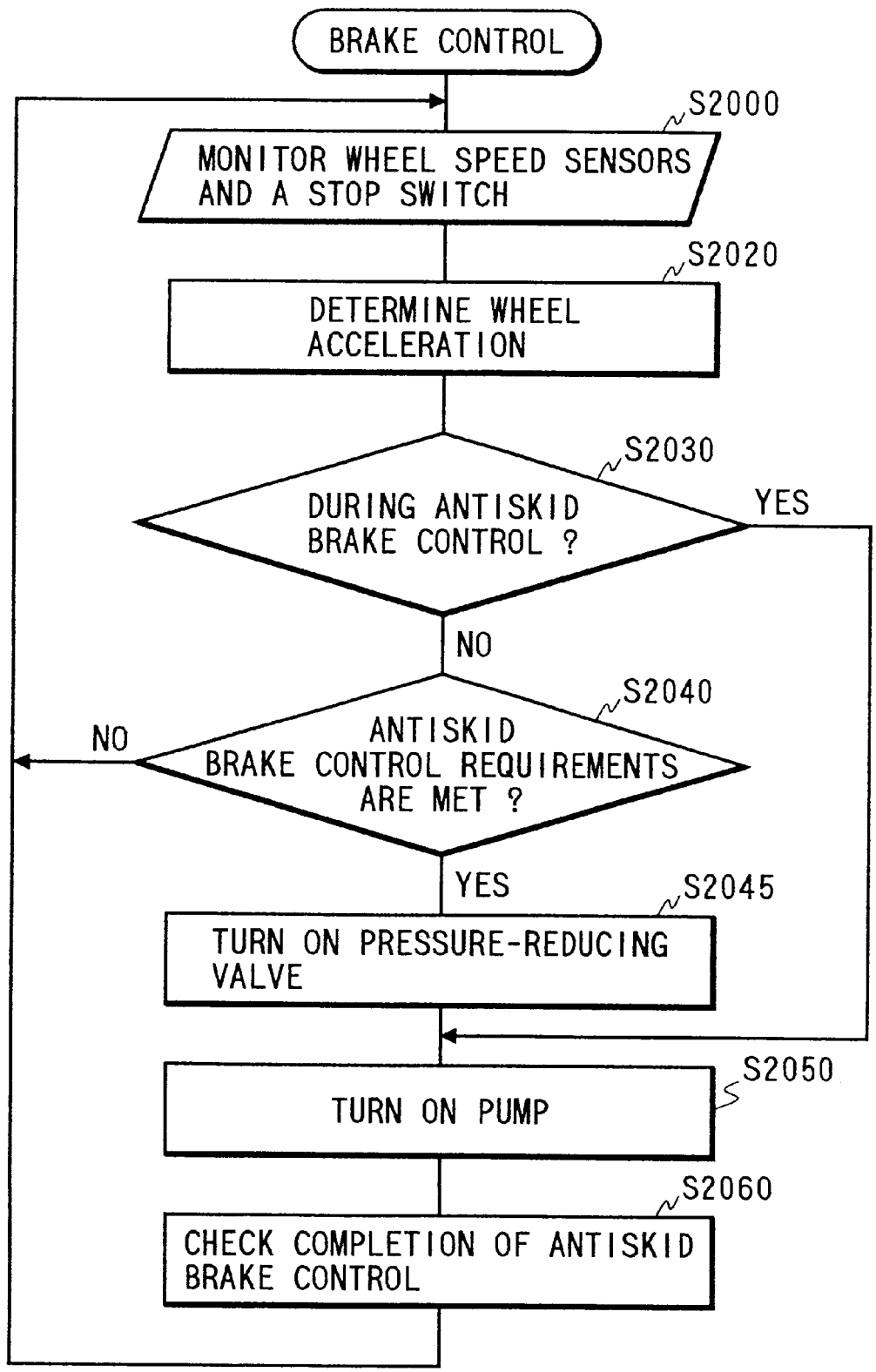
FIG. 11 is a flowchart of a braking control program performed by the braking system of FIG. 10.

FIG. 11 shows a flowchart of a program for brake control performed by the ECU 50 of this embodiment.

After entering the program, the routine proceeds to step 2000 wherein wheel speed sensors and a stop switch of the brake pedal 1 (both not shown) are monitored.

The routine proceeds to step 2020 wherein wheel accelerations are determined based on data derived by the wheel speed sensors, respectively.

The routine proceeds to step 2030 wherein it is determined whether the braking system is in an antiskid brake control mode or not based on the data derived in steps 2000 and 2020. If a NO answer is obtained meaning that the braking system is not in the antiskid brake control mode, then the routine proceeds to step 2040 wherein it is determined whether given antiskid brake control requirements are met or not. If a NO answer is obtained, then the routine returns back to step 2000.

When the brake pedal 1 is depressed by the vehicle operator, and it is determined that either or both of the wheels are approaching or have reached the road-tire adhesion limit based on the wheel accelerations determined in step 2020, the antiskid brake control requirements are encountered. Thus, a YES answer is obtained in step 2040, and the routine proceeds to step 2045 wherein the pressure-reducing valve 302 is turned on to establish fluid communication between the wheel cylinder 4 and the brake fluid reservoir 200. In step 2050, the braking system does not yet enter the antiskid control initiated, and the pressure rise-controlling valve 300 is in an opened position. The master cylinder pressure PU is thus transmitted to the brake fluid reservoir 200 through the pressure rise-controlling valve 300 and the pressure-reducing valve 302. Specifically, the brake fluid flows into the brake fluid reservoir 200, thereby causing the hydraulic pressure developed in the master cylinder 3 by depression of the brake pedal 1 to be decreased rapidly, so that a reaction force acting on a foot of the vehicle operator through the brake pedal 1 is reduced greatly.

The vehicle operator, therefore, feels this reduction in resistance of the brake pedal 1 physically and perceives that the road-tire adhesion limit is being approached or has been reached. Specifically, the reduction in resistance of the brake pedal 1 makes the vehicle operator perceive that a more increase in pedal effort would result in slippage of the wheels.

After step 2045, the routine proceeds to step 2050 wherein the pump 101 is turned on, and the braking system enters the antiskid brake control mode. Therefore, the reduction in resistance of the brake pedal 1 also makes the vehicle operator perceive that, when the wheel slippage occurs, the antiskid brake control is performed so that the kickback will take place. In the antiskid brake control, the rotation of the wheels is monitored, and the hydraulic braking pressure acting on the wheel cylinders 4 and 5 are increased and decreased cyclically to optimize the braking force acting on the wheels.

The routine proceeds to step 2060 wherein it is determined whether the antiskid brake control has been completed or not. If a YES answer is obtained, then the routine returns back to step 2000 to execute a subsequent program cycle.

The adjustment of the hydraulic braking pressure supplied to the wheel cylinder 4 of the front right wheel, for example, under the antiskid brake control is achieved by repeating a sequence of operations of closing the pressure rise-controlling valve 300, while maintaining the pressure-reducing valve 302 opened to decrease the hydraulic pressure in the wheel cylinder 4, closing both the pressure rise-controlling valve 300 and the pressure-reducing valve 302 according to a wheel slippage to hold the hydraulic pressure in the wheel cylinder 4, and then opening the pressure rise-controlling valve 300 cyclically to increase the hydraulic pressure in the wheel cylinder 4.

The pump 101 continues from the start of the antiskid brake control to pump the brake fluid out of the brake fluid reservoir 200 and the line downstream of the pressure-reducing valves 302 and 303 and delivers it to the line extending from the master cylinder 3 and the pressure rise-controlling valves 300 and 301 for compensating for lack of the brake fluid in the master cylinder 3.

If a YES answer is obtained in step 2060 meaning that the antiskid brake control has been completed, the pump off program, as discussed in FIG. 5, is initiated.

As apparent from the above discussion, the braking system of the third embodiment is designed to turn on the pressure-reducing valve 302 to reduce the reaction force against the pedal effort by the vehicle operator immediately before the antiskid brake control is performed to inform the vehicle operator that the wheel slippage has occurred or will occur and that the antiskid brake control will be performed soon.

The braking system of the third embodiment, as described above, returns the brake fluid back to the master cylinder 3 during the antiskid brake control, thereby causing the kickback to be transmitted to the vehicle operator through the brake pedal 1, but can inform the vehicle operator of generation of the kickback in advance. This alleviates an unpleasant feeding of the vehicle operator due to the kickback.

Figure 12:
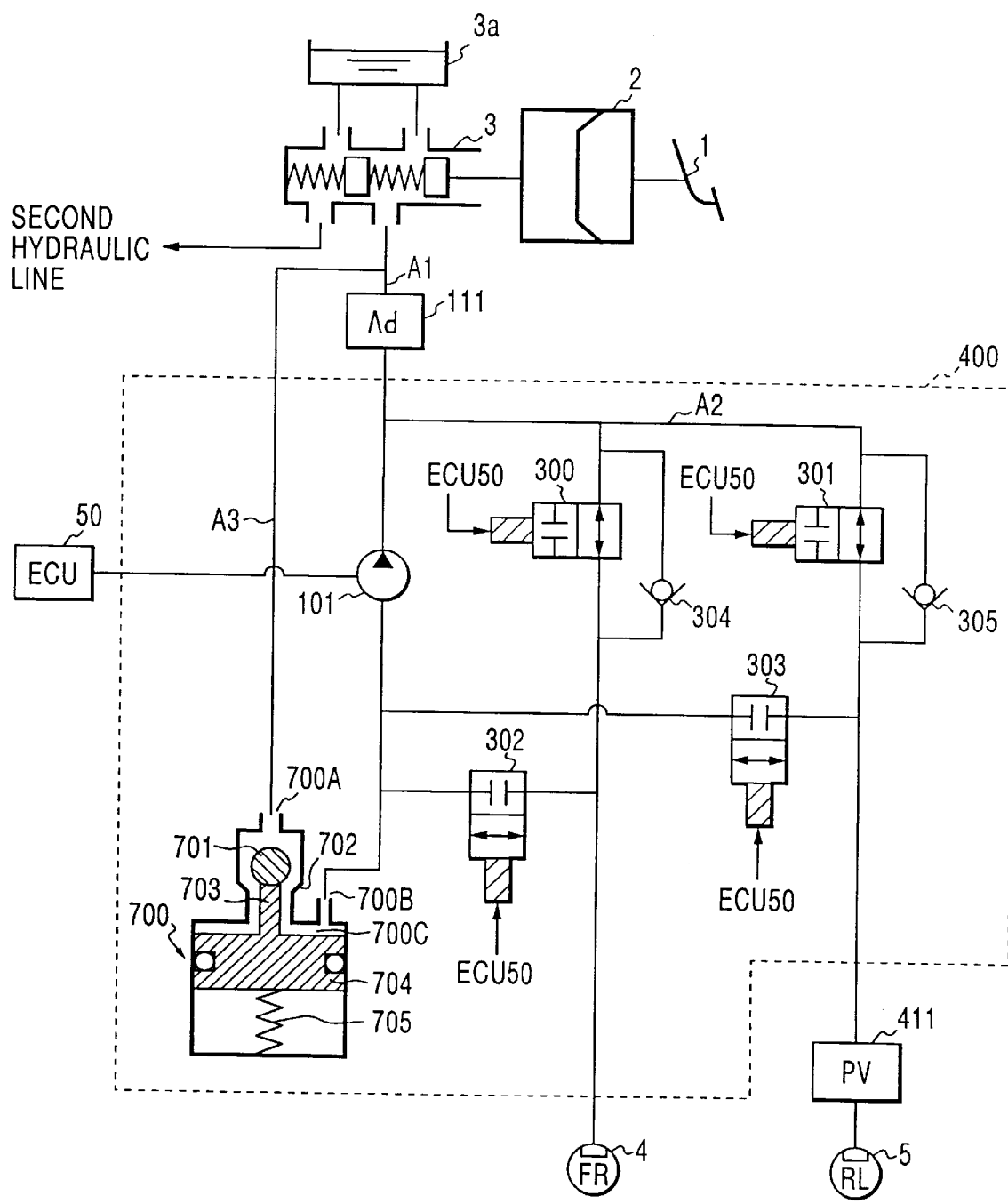
FIG. 12 is a hydraulic circuit diagram which shows a braking system according to the fourth embodiment of the invention.

FIG. 12 shows a braking system according to the fourth embodiment of the invention which is different from the third embodiment in FIG. 10 in that a proportional control valve 111 is disposed between the master cylinder 3 and the pump 101 and in structure of a brake fluid reservoir 700. Other arrangements are identical, and explanation thereof in detail will be omitted here.

The proportional control valve 111 is the same as the one shown in FIG. 9(a) and operates so that, when the brake fluid flows therethrough to the master cylinder 3, the pressure of the brake fluid is transmitted at a given damping rate. Specifically, when the second brake pressure PL in the line A2 is, as shown in FIG. 9(b), increased above the set pressure P1 of the proportional control valve 111 by the activity of the pump 101, the second brake pressure PL in the line A2 is transmitted to the line A1 at the damping rate, as indicated by the inclination of the solid line.

The brake fluid reservoir 700 is connected at a first port 700A to the line A1 between the master cylinder 3 and the proportional control valve 111 through the line A3 and at a second port 700B to the pump 101 and the outlets of the pressure-reducing valves 302 and 303.

Internally, the brake fluid reservoir 700 includes a ball 701, a piston 704, a rod 703 connecting the ball 701 to the piston 704, and a spring 705. The piston 704 defines a reservoir chamber 700C communicating with the first and second ports 700A and 700B. The piston 704 is urged by the spring 705 upwards, as viewed in the drawing, and moved according to the pressure within the reservoir chamber 700C to bring the ball 701 selectively into and out of engagement with a valve seat 702 for establishing and blocking communication between the first port 700A and the reservoir chamber 700C. Specifically, the brake fluid reservoir 700 is so designed as to stop fluid flow into the reservoir chamber 700C when the amount of brake fluid stored in the reservoir chamber 700C exceeds a maximum volume of the reservoir chamber 700C determined by a maximum stroke of the piston 704.

Figure 13:
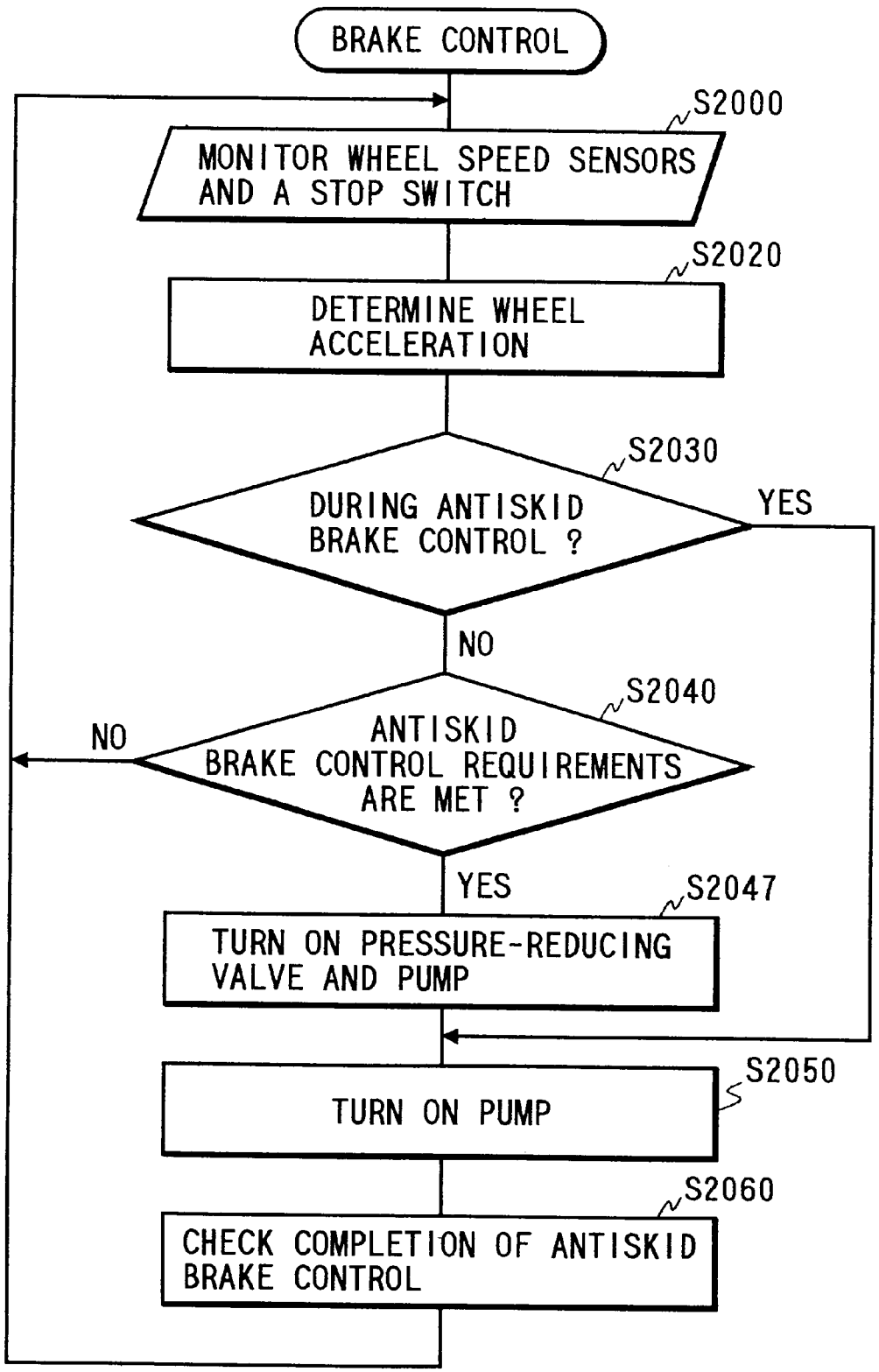
FIG. 13 is a flowchart of a braking control program performed by the braking system of FIG. 12.

FIG. 13 shows a flowchart of a program for brake control performed by the ECU 50 of the fourth embodiment which is different from the one shown in FIG. 11 only in step 2047. Other steps are identical, and explanation thereof in detail will be omitted here.

For example, when the brake pedal 1 is depressed by the vehicle operator, and it is determined that the front right wheel is approaching the road-tire adhesion limit based on the wheel accelerations determined in step 2020, the antiskid brake control requirements are encountered. A YES answer is, thus, obtained in step 2040, and the routine proceeds to step 2047 wherein the pressure rise-controlling valve 300 is turned on to block the fluid communication between the wheel cylinder 4 and the line A2, and the pump 101 is turned on. In step 2050, the braking system does not yet enter the antiskid control initiated, and the pressure-reducing valve 302 is in a closed position so that the brake fluid within the master cylinder 3 flows from the line A1 to the pump 101 through the line A3 and the brake fluid reservoir 700 and then is delivered to the line A2. This causes the hydraulic pressure within the master cylinder 3 to be decreased rapidly, so that the reaction force against the pedal effort provided by the vehicle operator is greatly reduced. The reduction in reaction force, like the above third embodiment, informs the vehicle operator that a further increase in pedal effort would result in slippage of the wheels. Specifically, the vehicle operator perceives that the wheel has reached or is approaching the road-tire adhesion limit physically through the brake pedal 1.

For example, when the front right wheel is under the antiskid brake control while the rear left wheel is not under the antiskid brake control, the hydraulic braking pressure in the line A2 increased by the pump 101 above that in the master cylinder 3 is transmitted through the pressure rise-controlling valve 301 to the wheel cylinder 5 to increase a braking effort acting on the rear left wheel.

The braking system of the third and fourth embodiments may be designed to inform the vehicle operator regardless of the antiskid brake control that the wheels have reached or are approaching the road-tire adhesion limit based on wheel slippage conditions, wheel speed, and wheel acceleration.

Figure 14:
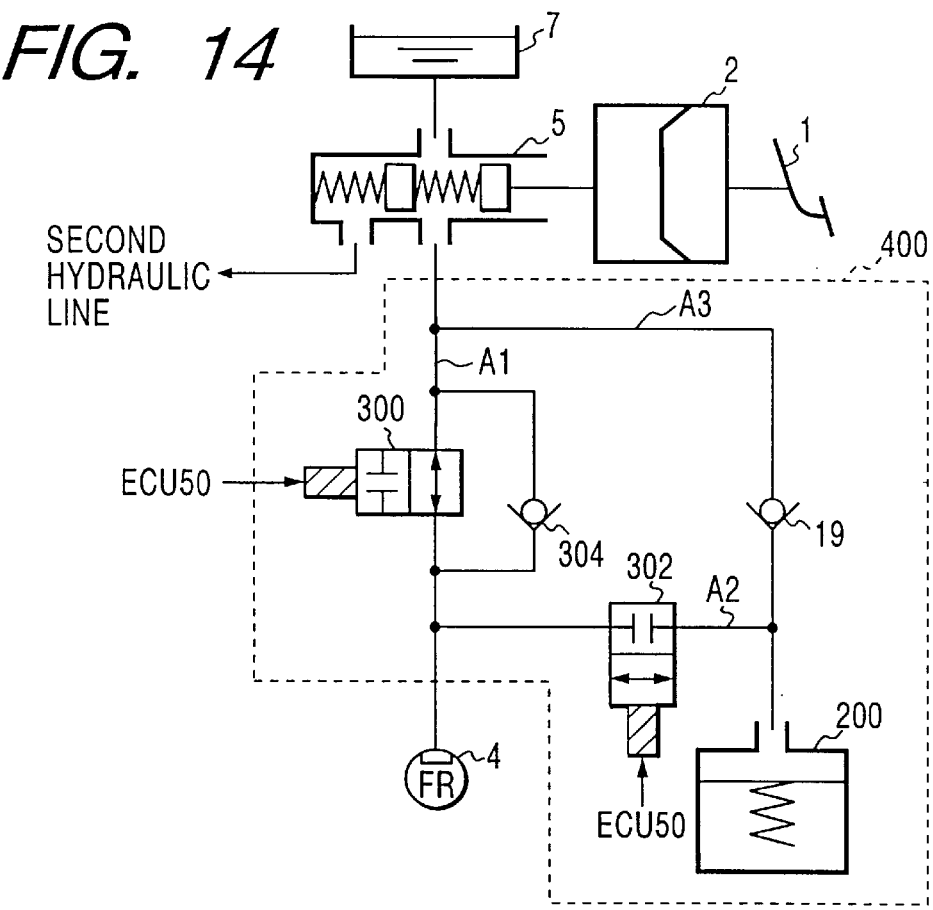
FIG. 14 is a hydraulic circuit diagram which shows a braking system according to the fifth embodiment of the invention.

FIG. 14 shows a braking system according to the fifth embodiment of the invention.

The antiskid hydraulic system 400, like the above embodiments, Is disposed in the first hydraulic line (i.e., the front right-rear left hydraulic line) of the X type dual circuit for controlling the hydraulic braking pressure acting on the front right and rear left wheels, however, the drawing illustrates only half of the first hydraulic line connected to a wheel cylinder 4 for the front right wheel for the sake of simplicity. The same applies to other embodiments as will be discussed later.

A master cylinder 5 is connected to a master reservoir 7 storing therein a brake fluid and delivers the hydraulic pressure increased by the booster 2 to the antiskid hydraulic system 400.

The antiskid hydraulic system 400 includes a pressure rise-controlling valve 300, a pressure-reducing valve 302, check valves 304 and 19, and a brake fluid reservoir 200.

The pressure rise-controlling valve 300 and the pressure-reducing valve 302 are turned on and off by an electronic control unit (ECU) 50. The pressure rise-controlling valve 300 is disposed between the master cylinder 5 and the wheel cylinder 4. The check valve 304 is disposed parallel to the pressure rise-controlling valve 300. The brake fluid reservoir 200 is connected to the master cylinder 5 through the check valve 19 arranged within the line A3. The pressure-reducing valve 302 is disposed within the line A2 extending from a downstream portion of the line A3 to the wheel cylinder 4.

Figure 15:
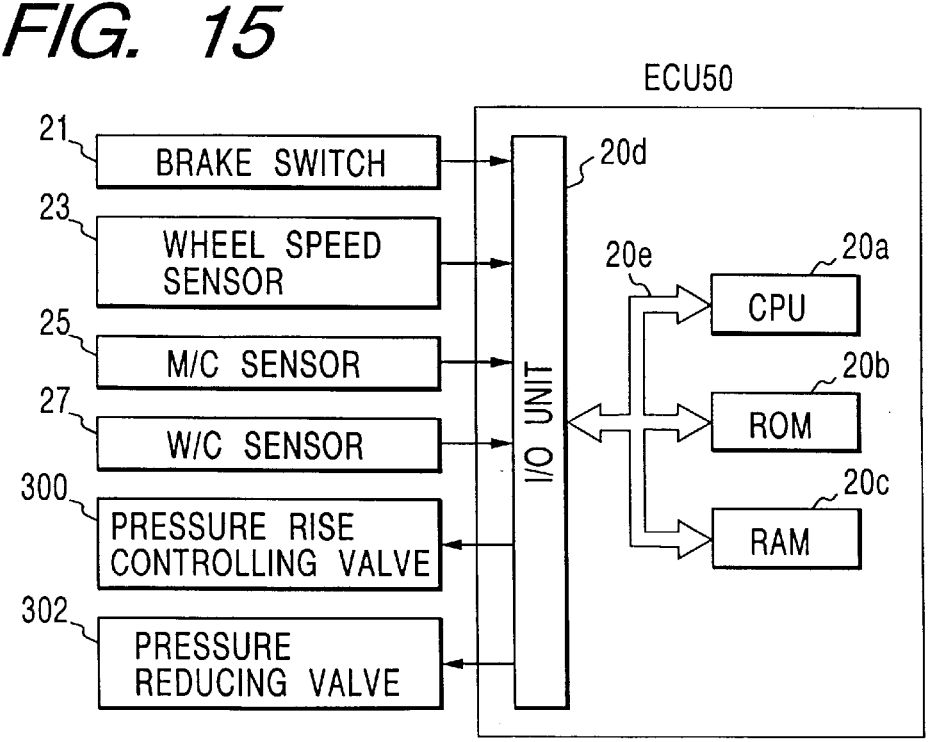
FIG. 15 is a block diagram which shows an electronic control unit, sensors, and valves connected to the electronic control valve.

The ECU 50 includes, as shown in FIG. 15, a microcomputer consisting of a CPU 20a, a ROM 20b, a RAM 20c, an I/O unit 20d, and a bus line 20e. The I/O unit 20d is connected to a brake switch 21, a wheel speed sensor 23, a master cylinder pressure sensor 25, a wheel cylinder pressure sensor 27, the pressure rise-controlling valve 300, and the pressure reduction control vale 302.

The brake switch 21 is turned on in response to depression of the brake pedal 1 and provides a signal indicative thereof. The wheel speed sensor 23 measures the speed of each wheel and provides a signal indicative thereof. The master cylinder pressure sensor 25 measures the master cylinder pressure and provides a signal indicative thereof. The wheel cylinder pressure sensor 27 measures the wheel cylinder pressure in each wheel cylinder and provides a signal indicative thereof.

Figure 16:
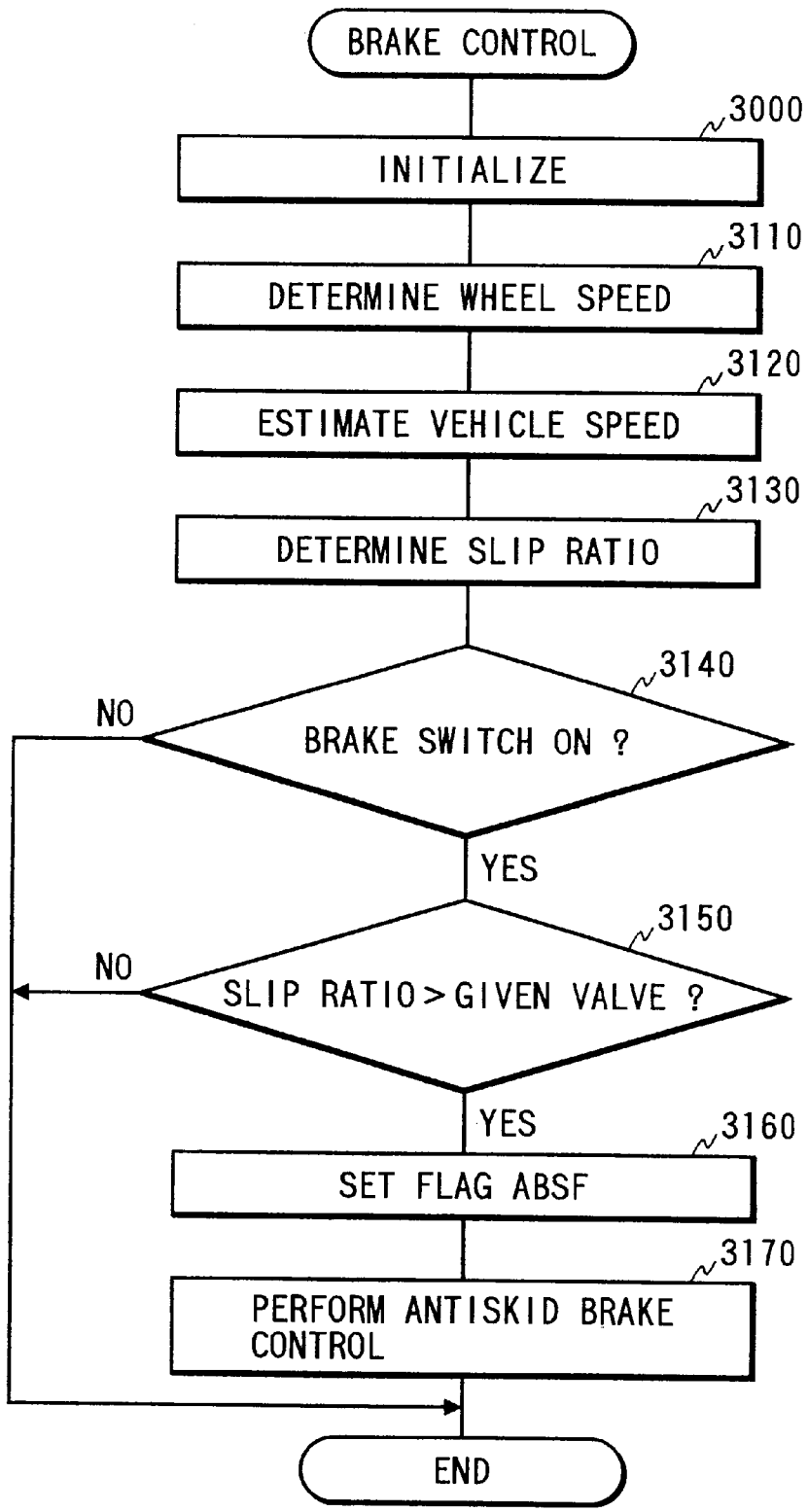
FIG. 16 is a flowchart of a braking control program performed by the braking system of FIG. 14.

FIG. 16 shows a flowchart of a brake control program performed by the ECU 50.

After entering the program, the routine proceeds to step 3000 wherein given control parameters such as an antiskid brake control flag ABSF are initialized.

The routine proceeds to step 3110 wherein wheel speeds Vw of all the wheels are determined based on signals from the wheel speed sensor 23.

The routine proceeds to step 3120 wherein a vehicle speed Vs is estimated based on the greatest of the wheel speeds Vw determined in step 3110.

The routine proceeds to step 3130 wherein a slip ratio S of each wheel is determined based on the vehicle speed Vs and one of the wheel speeds Vw using the equation (1) below.

$$S=(V_s-V_w)/V_s \qquad (1)$$

The routine proceeds to step 3140 wherein it is determined whether the brake switch is turned on or off, that is, whether the brake pedal 1 is depressed or not. If a YES answer is obtained, then the routine proceeds to step 3160. Alternatively, if a NO answer is obtained, then this program cycle terminates.

In step 3150, it is determined whether the slip ratio S of each wheel is greater than a given value or not, that is, whether the antiskid control should be performed or not. If a NO answer is obtained, then this program cycle terminates. Alternatively, if a YES answer is obtained meaning that an antiskid control requirement has been met, then the routine proceeds to step 3160 wherein the antiskid brake control flag ABSF is set to one (1) indicating that the antiskid brake control has been entered.

The routine then proceeds to step 3170 wherein the pressure rise-controlling valve 300 and the pressure-reducing valve 302 are controlled in the same manner as described in the above embodiments to regulate the hydraulic braking pressure acting on the wheel cylinder 4 in the antiskid brake control.

Figure 17:
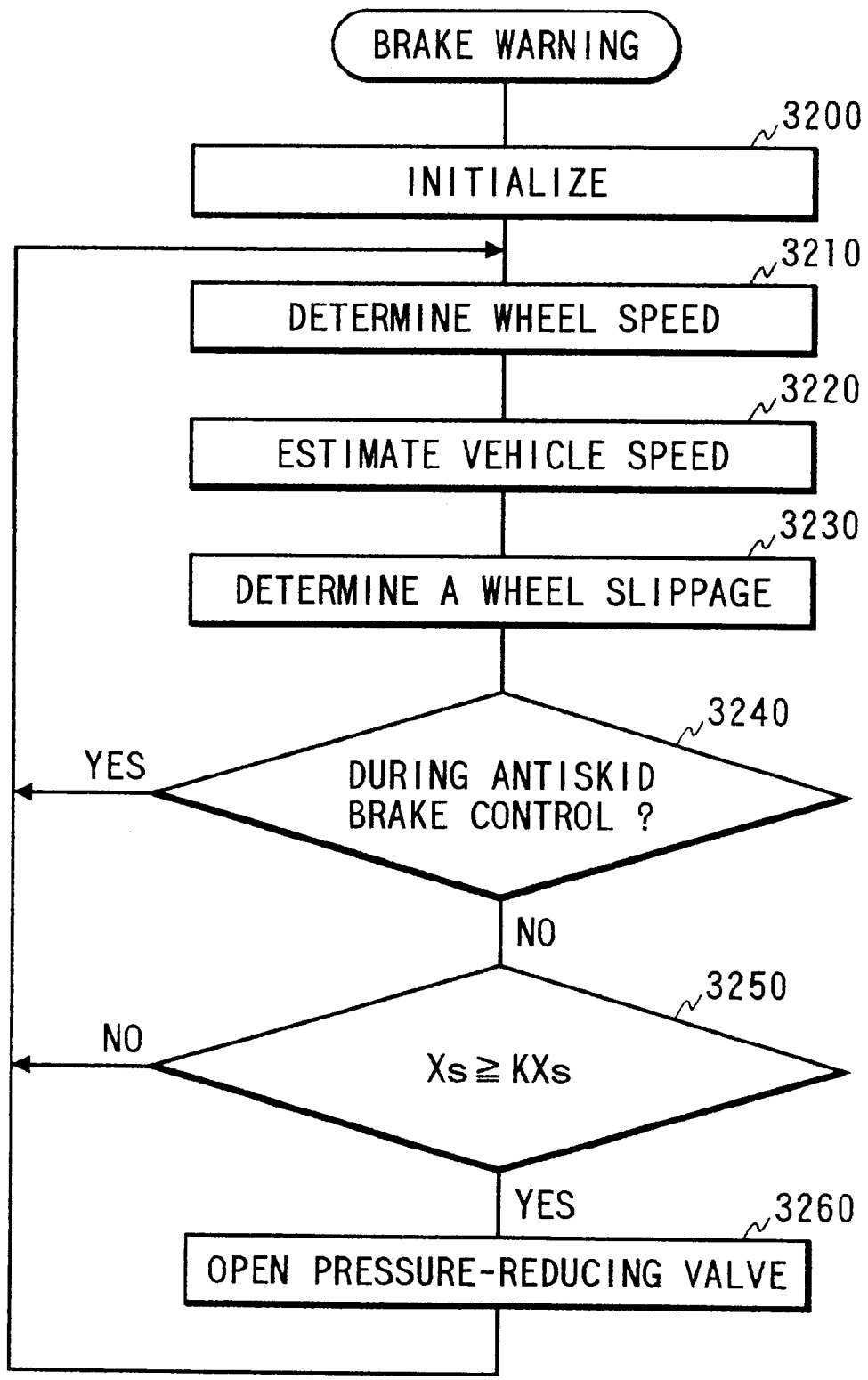
FIG. 17 is a flowchart of a brake warning program performed by the braking system of FIG. 14.

FIG. 17 shows a flowchart of a brake warning program performed by the ECU 50 based on a wheel slippage.

After entering the program, the routine proceeds to step 3200 wherein given control parameters are initialized.

The routine proceeds to step 3210 wherein wheel speeds Vw of all the wheels are determined based on signals from the wheel speed sensor 23.

The routine proceeds to step 3220 wherein a vehicle speed Vs is estimated mathematically in a given relation to the greatest of the wheel speeds Vw determined in step 3210. The vehicle speed Vs determined in step 3120 of FIG. 16 may be used in step 3220.

The routine proceeds to step 3230 wherein a wheel slippage Vs of each wheel is determined based on the vehicle speed Vs and one of the wheel speeds Vw using the equation (2) below.

$$X_s=(V_s-V_w) \qquad (2)$$

The routine proceeds to step 3240 wherein it is determined whether the braking system is in the antiskid brake control or not by checking the status of the antiskid brake control flag ABSF set in the program of FIG. 16. If a YES answer is obtained, then the routine returns back to step 3210. Alternatively, if a NO answer is obtained, then the routine proceeds to step 3250.

In step 3250, it is determined whether the wheel slippage Xs is greater than a reference value KXs or not to determine whether a braking effort is too great for a current road surface condition or not, that is, whether the wheel is approaching or has reached the road-tire adhesion limit or not. Note that the reference value KXs is so determined that a subsequent step 3260 will be performed prior to execution of the antiskid brake control.

If a NO answer is obtained in step 3250, then the routine returns back to step 3210. Alternatively, if a YES answer is obtained, then the routine proceeds to step 3260 wherein the pressure-reducing valve 302 is turned on to be opened for a given period of time, while maintaining the pressure rise-controlling valve 300 off or opened to drain the brake fluid in the line A1 extending between the master cylinder 5 and the wheel cylinder 4 into the brake fluid reservoir 200. This causes the hydraulic pressure within the master cylinder 5 to drop, thereby reducing a reaction force against the pedal effort by the vehicle operator. The vehicle operator, thus, feels the reduction in reaction force from the brake pedal 1 physically and perceives that the vehicle is approaching or has reached the road-tire adhesion limit, and the antiskid brake control will be performed soon.

Figure 18:
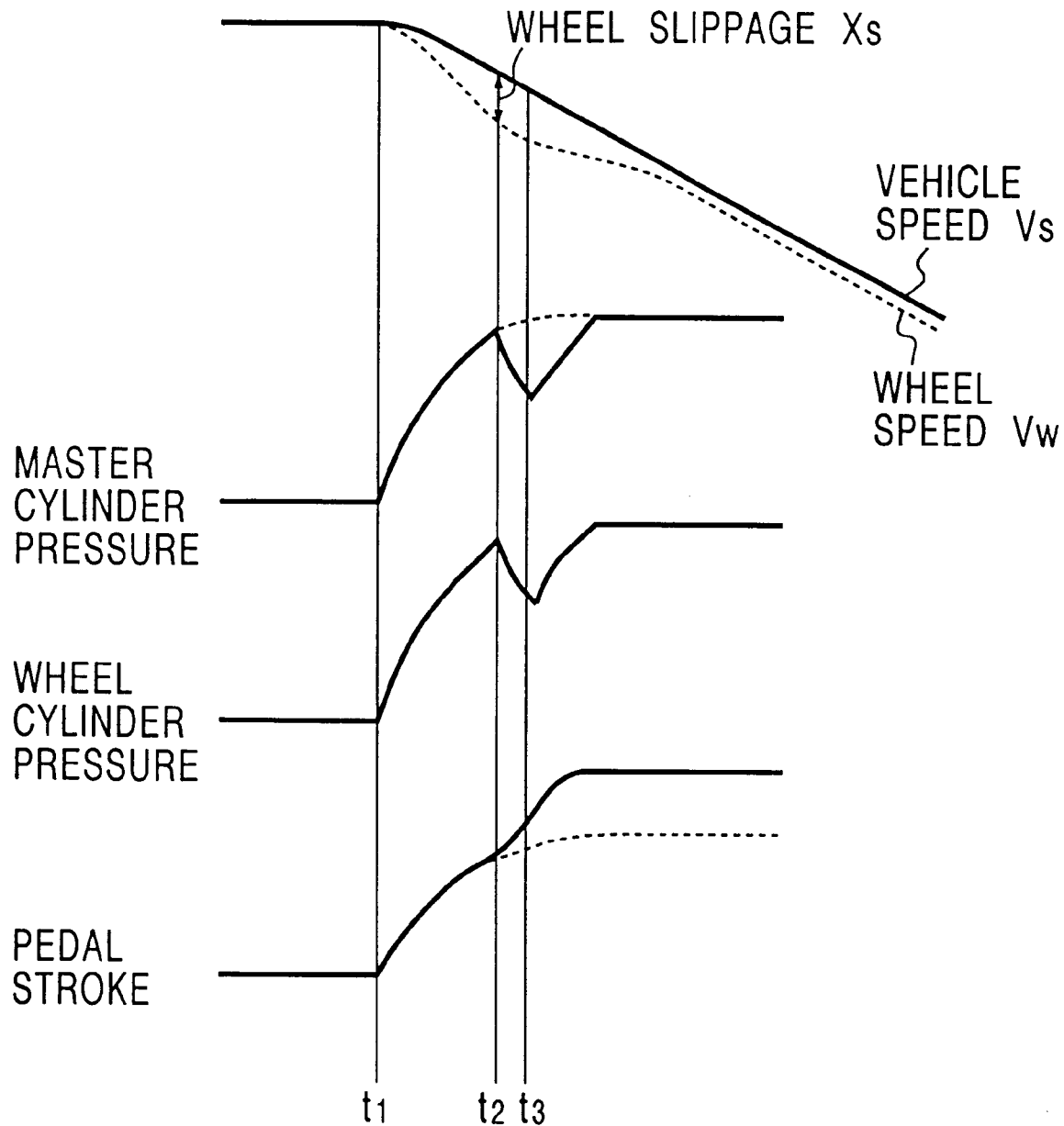
FIG. 18 is a time chart which shows the relation among master cylinder pressure, wheel cylinder pressure, and pedal stroke.

FIG. 18 is a time chart showing variations in master cylinder pressure, wheel cylinder pressure, and a pedal stroke in a relation to the wheel slippage Xs.

Assuming that the brake pedal 1 is depressed at a time t1, the hydraulic pressure within the master cylinder 5 is increased, so that the wheel speeds Vw are decreased, thereby causing the wheel slippage Xs to be increased.

When the wheel slippage Xs of one of the wheels (e.g., the front right wheel) exceeds the reference value KXs at a time t2, the pressure-reducing valve 302 is turned on to be opened, while maintaining the pressure rise-controlling valve 300 turned off or opened, so that the hydraulic pressure within the wheel cylinder 4 and the master cylinder 5 is decreased. The decrease in hydraulic pressure within the wheel cylinder 4 result in a decrease in wheel slippage of the front right wheel. The decrease in hydraulic pressure within the master cylinder 5 is transmitted to the brake pedal 1 and informs the vehicle operator of proximity to the road-tire adhesion limit. Subsequently, at a time t3, the antiskid brake control is initiated.

Specifically, the vehicle operator can physically perceive that a braking effort is too great to produce an optimum braking force, and the antiskid brake control will be performed soon. The decrease in braking effort, thus, permits the vehicle to be maintained under control of the vehicle operator without entering the antiskid brake control mode.

Figure 19:
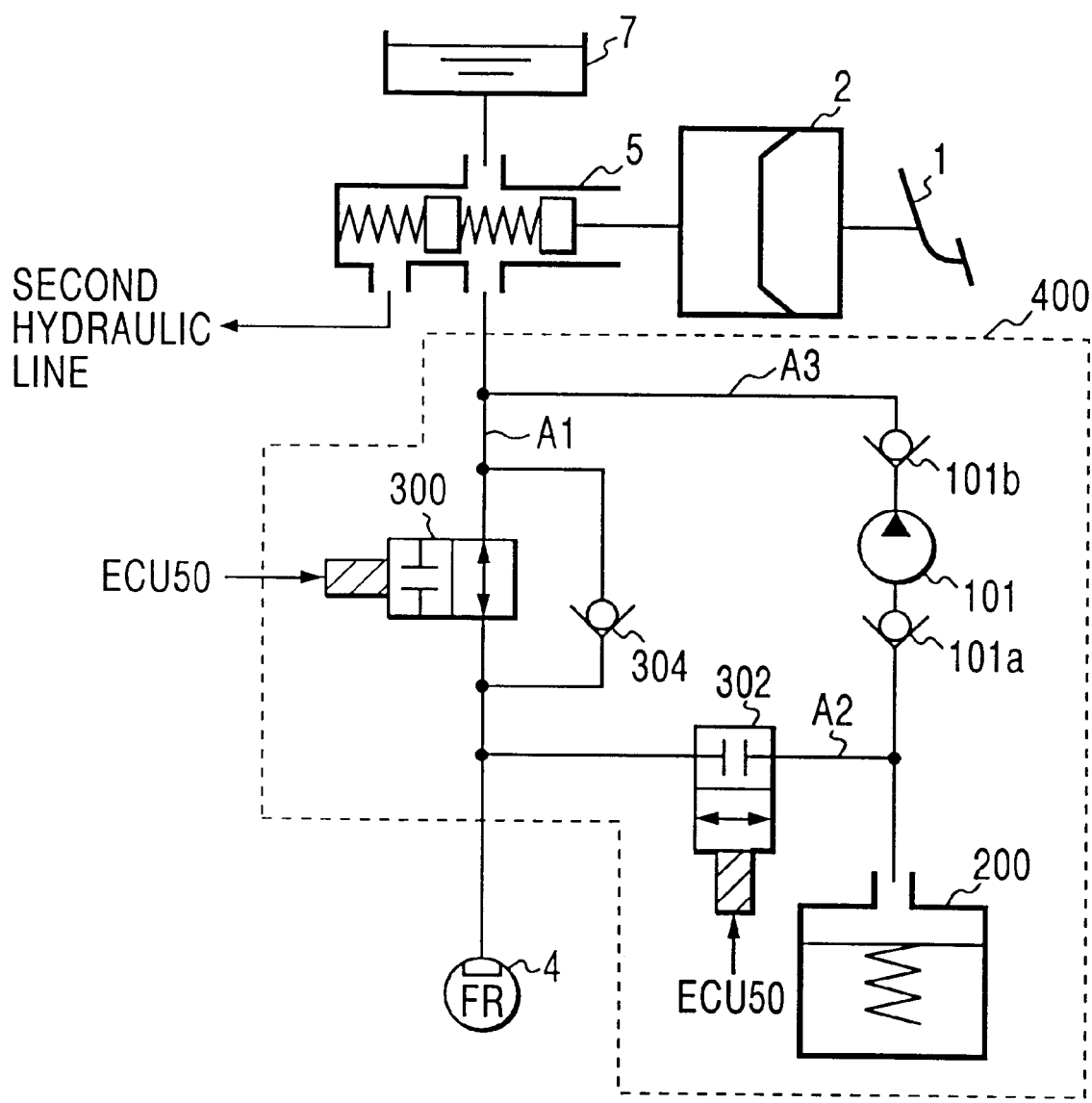
FIG. 19 is a hydraulic circuit diagram which shows a modification of the braking system of FIG. 14.

FIG. 19 shows a modification of the braking system in FIG. 14 which includes a pump 101 and check valves 110a and 101b.

The pump 101 is turned on by the ECU 50 when the amount of brake fluid stored in the brake fluid reservoir 200 has reached a given level to pump the brake fluid into the master cylinder 5. This permits the hydraulic pressure within the master cylinder 5 to be decreased many times by turning on the pressure-reducing valve 302 repeatedly. Specifically, the vehicle operator can be informed many times that the wheels are approaching or have reached the road-tire adhesion limit.

Figure 20:
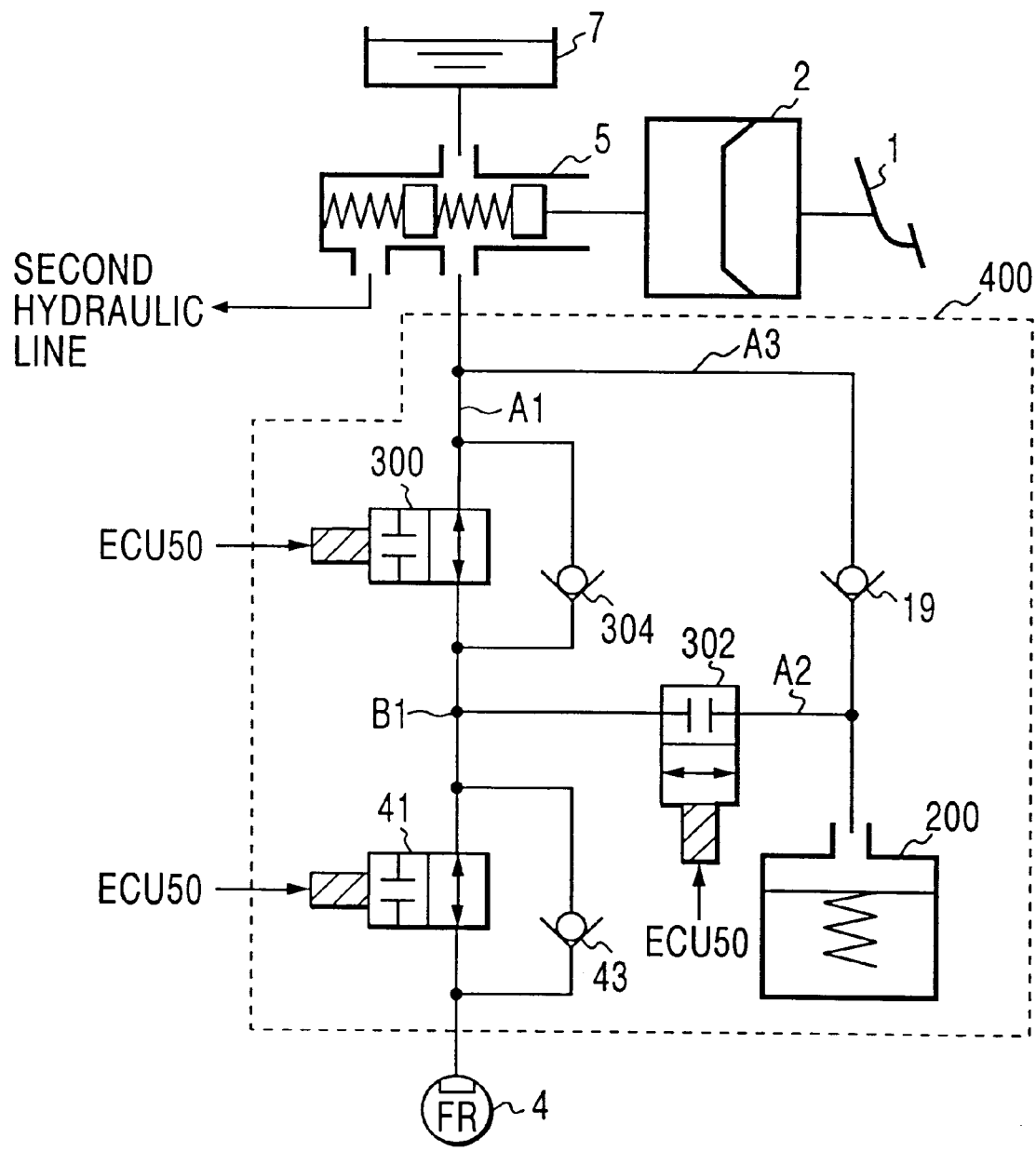
FIG. 20 is a hydraulic circuit diagram which shows a braking system according to the sixth embodiment of the invention.

FIG. 20 shows a braking system according to the sixth embodiment of the invention which is different from the fifth embodiment in FIG. 14 in only that a solenoid controlled valve 41 and a check valve 43 are disposed between the wheel cylinder 4 and a junction B1 of an outlet of the pressure rise-controlling valve 300 and an inlet of the pressure-reducing valve 302. Other arrangements are identical, and explanation thereof in detail will be omitted here.

Figure 21:
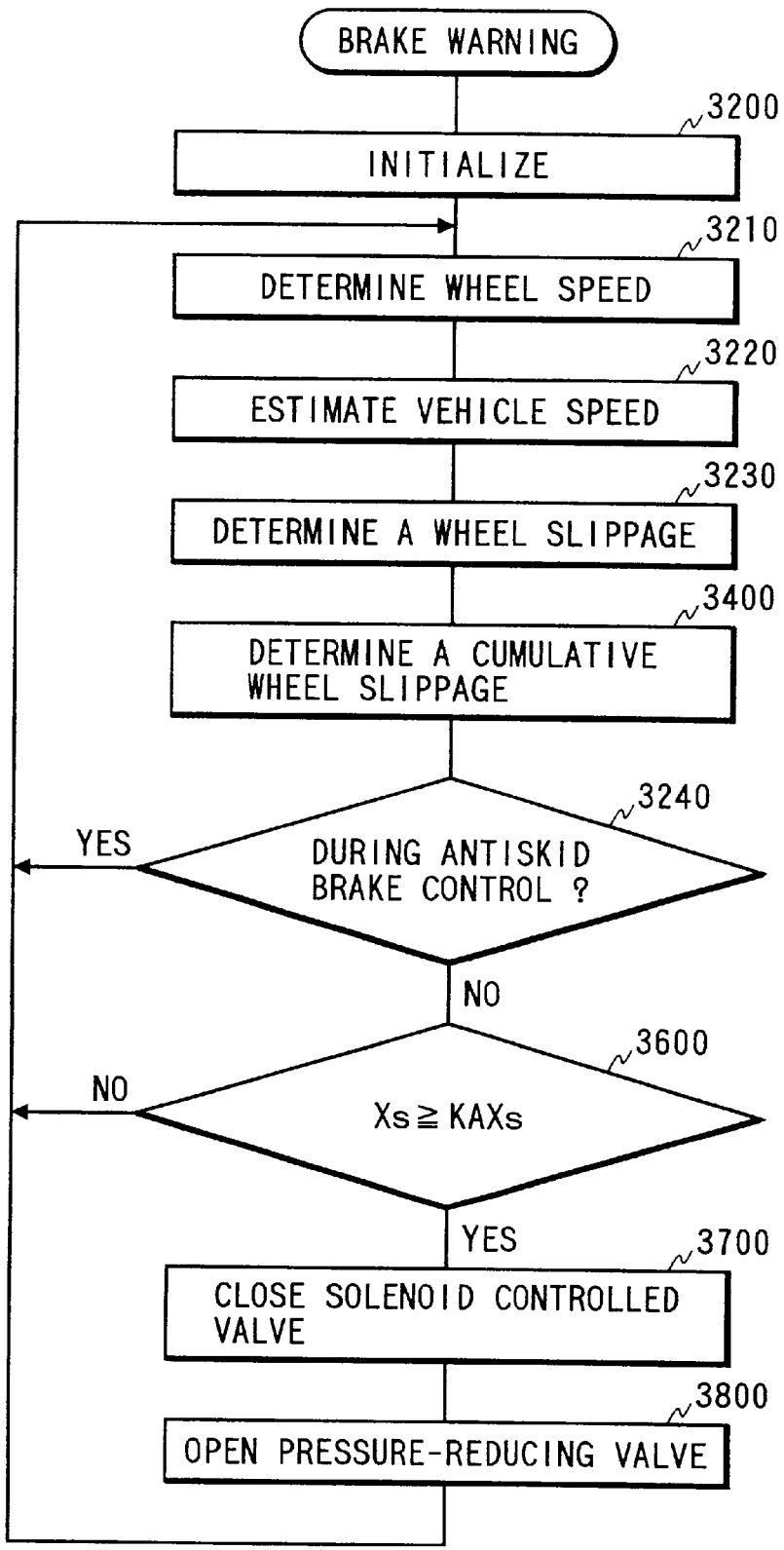
FIG. 21 is a flowchart of a brake warning program performed by the braking system of FIG. 20.

FIG. 21 shows a flowchart of a brake warning program of this embodiment performed by the ECU 50 based on a cumulative value of wheel slippages. The same reference numbers as employed in the flowchart of FIG. 17 refer to the same steps, and explanation thereof in detail will be omitted here.

After the wheel slippage Xs of each wheel is determined in step 3230, the routine proceeds to step 3400 wherein, when the current program execution cycle is the second or later cycle, the wheel slippage or slippages Xs of each wheel calculated in the previous program cycle or cycles after the brake switch 21 is turned on is or are added to the wheel slippage Xs of corresponding one of the wheels calculated in this program cycle to determine a cumulative wheel slippage value AXs of each wheel.

If a NO answer is obtained in step 3240 meaning that the antiskid brake control is not yet performed, then the routine proceeds to step 3600 wherein it is determined whether the cumulative wheel slippage value AXs is greater than or equal to a reference value KAXs or not. If a NO answer is obtained, then the routine returns back to step 3210. Alternatively, if a YES answer is obtained meaning that the braking effort is too great to produce an optimum braking force, then the routine proceeds to step 3700.

In step 3700, the solenoid controlled valve 41 is turned on to block the fluid communication between itself and the wheel cylinder 4.

The routine then proceeds to step 3800 wherein the pressure-reducing valve 302 is turned on to be opened for a given period of time, while maintaining the pressure rise-controlling valve 300 off or opened to drain the brake fluid in the line A1 extending between the master cylinder 5 and an inlet of the solenoid controlled valve 41 into the brake fluid reservoir 200. This causes the hydraulic pressure within the master cylinder 5 to be decreased, while the hydraulic pressure within the wheel cylinder 4 is held as is, thereby reducing the reaction force against depression of the brake pedal 1 similar to the above fifth embodiment.

The braking system of this embodiment, as apparent from the above, uses the cumulative wheel slippage value AXs instead of the wheel slippage Xs as used in the fifth embodiment. The control accuracy is, thus, improved as compared with that of the fifth embodiment. Additionally, the braking system of this embodiment holds the hydraulic pressure within the wheel cylinder 4 while decreasing the hydraulic pressure within the master cylinder 5 and thus is suitable for a system designed to regulate hydraulic braking pressures in wheel cylinders more accurately and independently.

Figure 22:
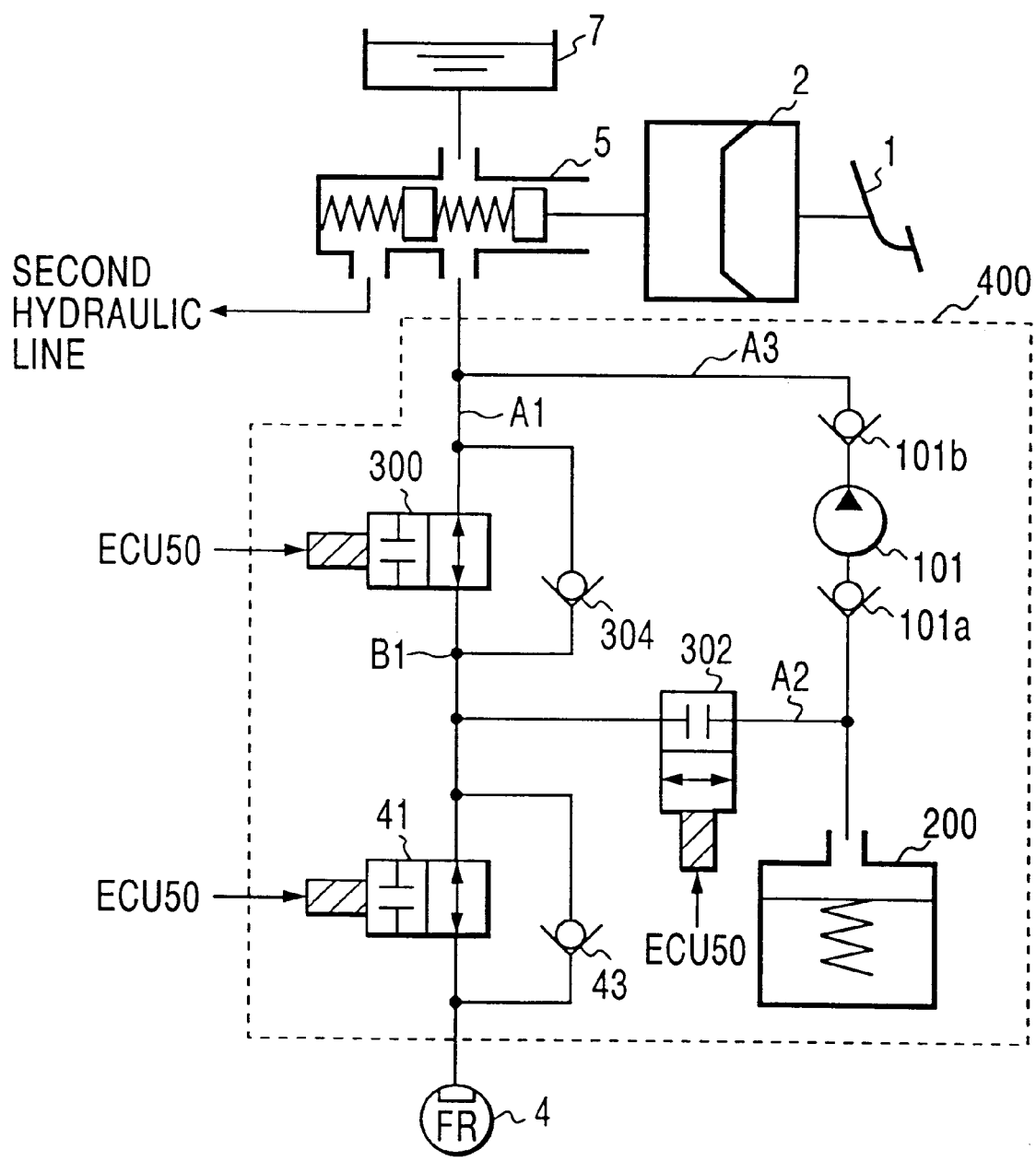
FIG. 22 is a hydraulic circuit diagram which shows a modification of the braking system of FIG. 20.

FIG. 22 shows a modification of the braking system of the sixth embodiment in FIG. 20 which includes a pump 101 and check valves 101a and 101b. The pump 101 and the check valves 101a and 110b are identical in structure, operation, and effect with those shown in FIG. 19, and explanation thereof in detail will be omitted here.

Figure 23:
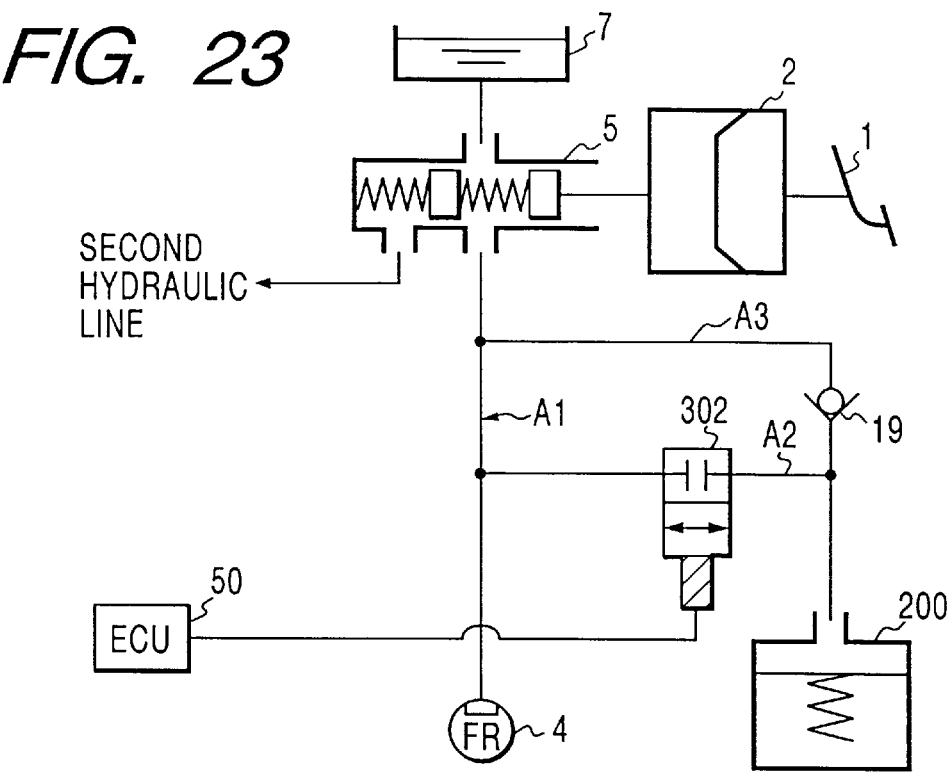
FIG. 23 is a hydraulic circuit diagram which shows a braking system according to the seventh embodiment of the invention.

FIG. 23 shows a braking system according to the seventh embodiment of the invention which is different from those of the above embodiments in that the antiskid hydraulic system 400 is not provided.

The braking system of this embodiment includes a pressure-reducing valve 302 and a check valve 19. The pressure-reducing valve 302 is disposed between a wheel cylinder 4 and a brake fluid reservoir 200. The check valve 19 is so disposed as to restrict the direct fluid flow from the master cylinder 5 to the brake fluid reservoir 200. Other arrangements are the same as those of the sixth embodiment shown in FIG. 20.

Figure 24:
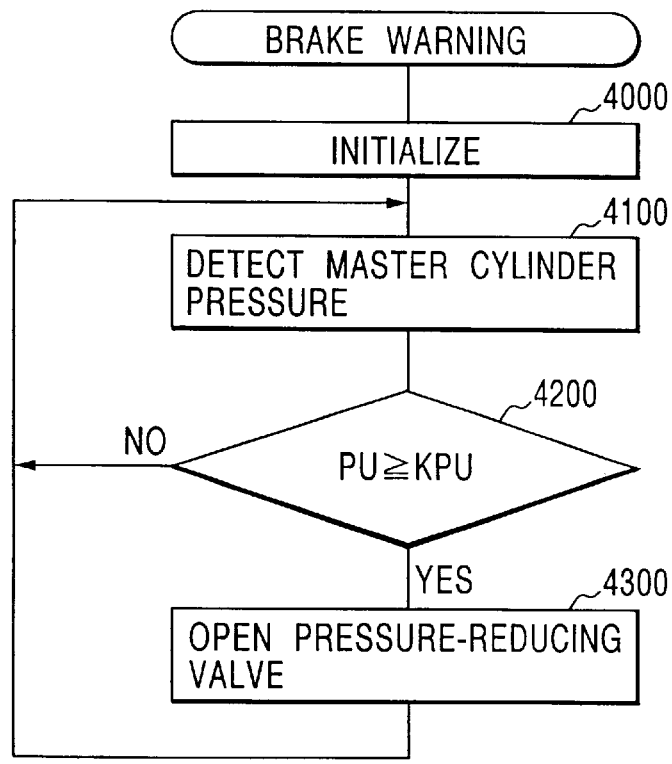
FIG. 24 is a flowchart of a brake warning program performed by the braking system of FIG. 23.

FIG. 24 shows a flowchart of a brake warning program of this embodiment performed by the ECU 50.

After entering the program, the routine proceeds to step 4000 wherein given control parameters are initialized.

The routine proceeds to step 4100 wherein the hydraulic pressure PU outputted from the master cylinder 5 is determined based on a signal from the master cylinder pressure sensor 25.

The routine proceeds to step 4200 wherein it is determined whether the hydraulic pressure PU determined in step 4100 is greater than or equal to a reference pressure level KPU or not. If a NO answer is obtained, then the routine returns back to step 4100. Alternatively, if a YES answer is obtained meaning that the hydraulic pressure PM from the master cylinder 5 is too great to produce an optimum braking force, then the routine proceeds to step 4300.

Usually, determination of whether the hydraulic pressure delivered by the master cylinder 5 is at a suitable brake pressure level or not depends largely on the nature and conditions of the road. It is thus advisable that the reference pressure level KPU be changed according to the road conditions. For example, when the friction or adhesion $\mu$ between a tire and a road surface is greater, the reference pressure level KPU may be increased because a smaller wheel slippage should occur even if the hydraulic pressure PM produced by he master cylinder 5 is relatively high. Conversely, when the road-tire adhesion $\mu$ is smaller, the reference pressure level KPU may be decreased. Note that the road-tire adhesion $\mu$ may be determined in a known manner based on the wheel slippage Xs during braking.

In step 4300, the pressure-reducing valve 302 is turned on to establish the fluid communication between the line A1 and the line A2 to drain the brake fluid within the line A1 into the brake fluid reservoir 200, thereby reducing the hydraulic pressure within the master cylinder 5 and the wheel cylinder 4 for decreasing the reaction force against the pedal effort by the vehicle operator. The decrease in reaction force, like the above embodiments, informs the vehicle operator that the road-tire adhesion limit is being approached or has been reached before the wheels are locked.

Figure 25:
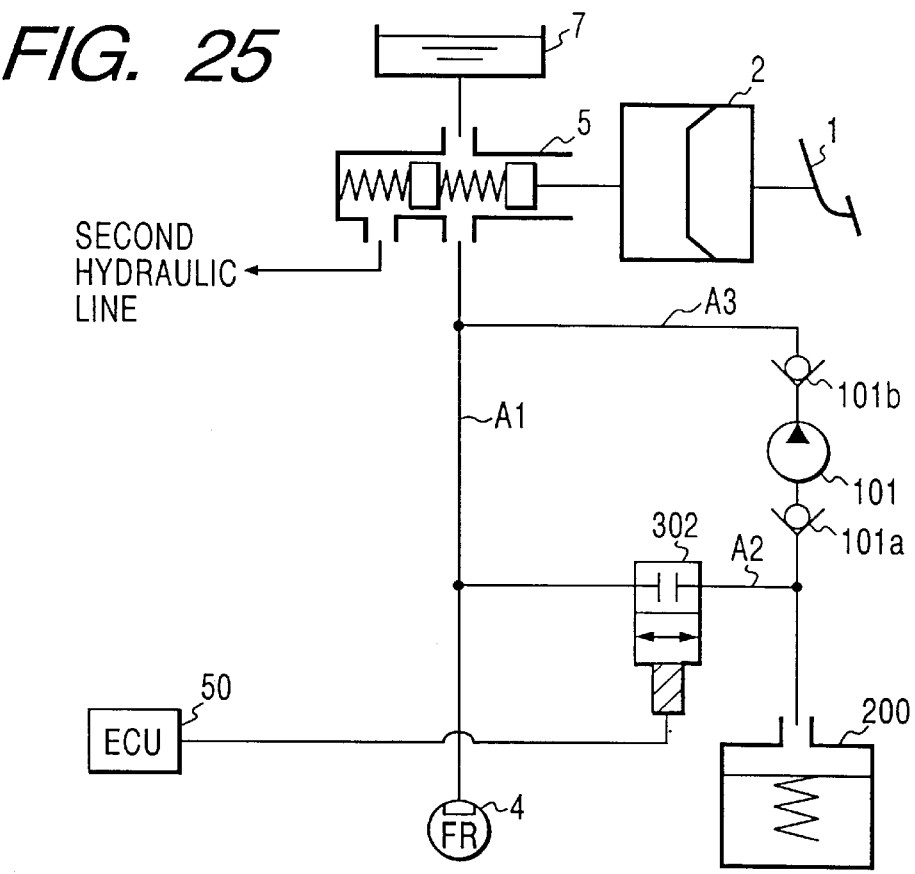
FIG. 25 is a hydraulic circuit diagram which shows a modification of the braking system of FIG. 23.

FIG. 25 shows a modification of the braking system of the seventh embodiment in FIG. 23 which includes a pump 101 and check valves 101a and 101b. The pump 101 and the check valves 101a and 101b are identical in structure, operation, and effect with those shown in FIG. 19, and explanation thereof in detail will be omitted here.

Figure 26:
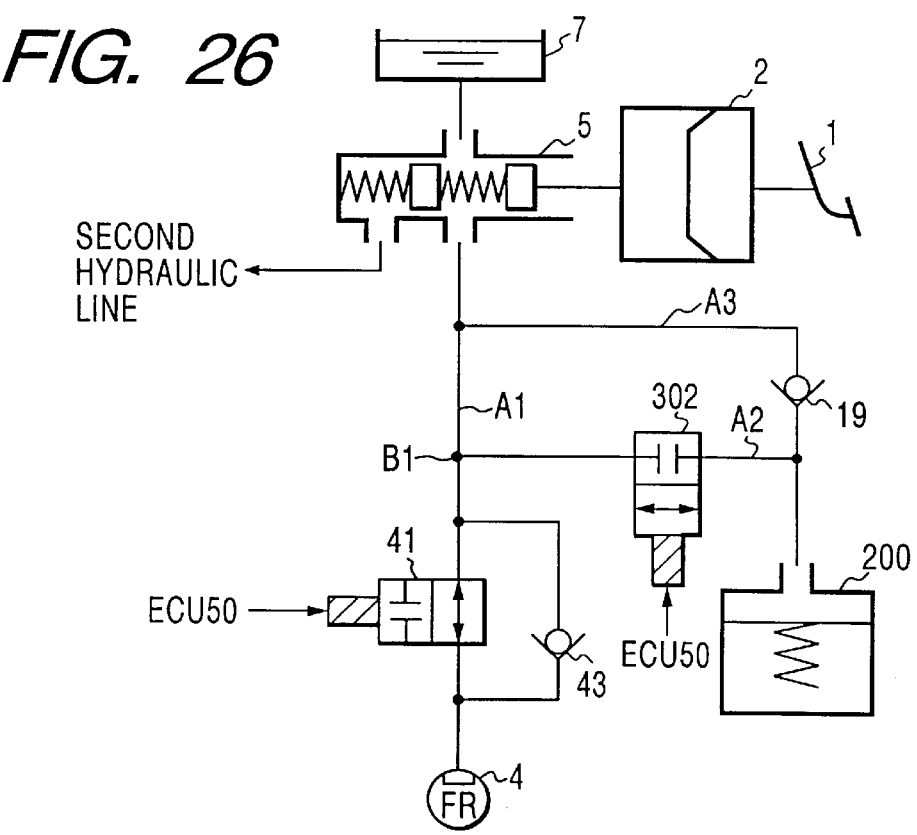
FIG. 26 is a hydraulic circuit diagram which shows a braking system according to the eighth embodiment of the invention.

FIG. 26 shows a braking system according to the eighth embodiment of the invention which is different from the seventh embodiment in FIG. 23 in only that a solenoid controlled valve 41 and a check valve 43 are disposed between the wheel cylinder 4 and a junction B1 of the line A1 leading to the master cylinder 5 and an inlet of the pressure-reducing valve 302. Other arrangements are identical, and explanation thereof in detail will be omitted here.

Figure 27:
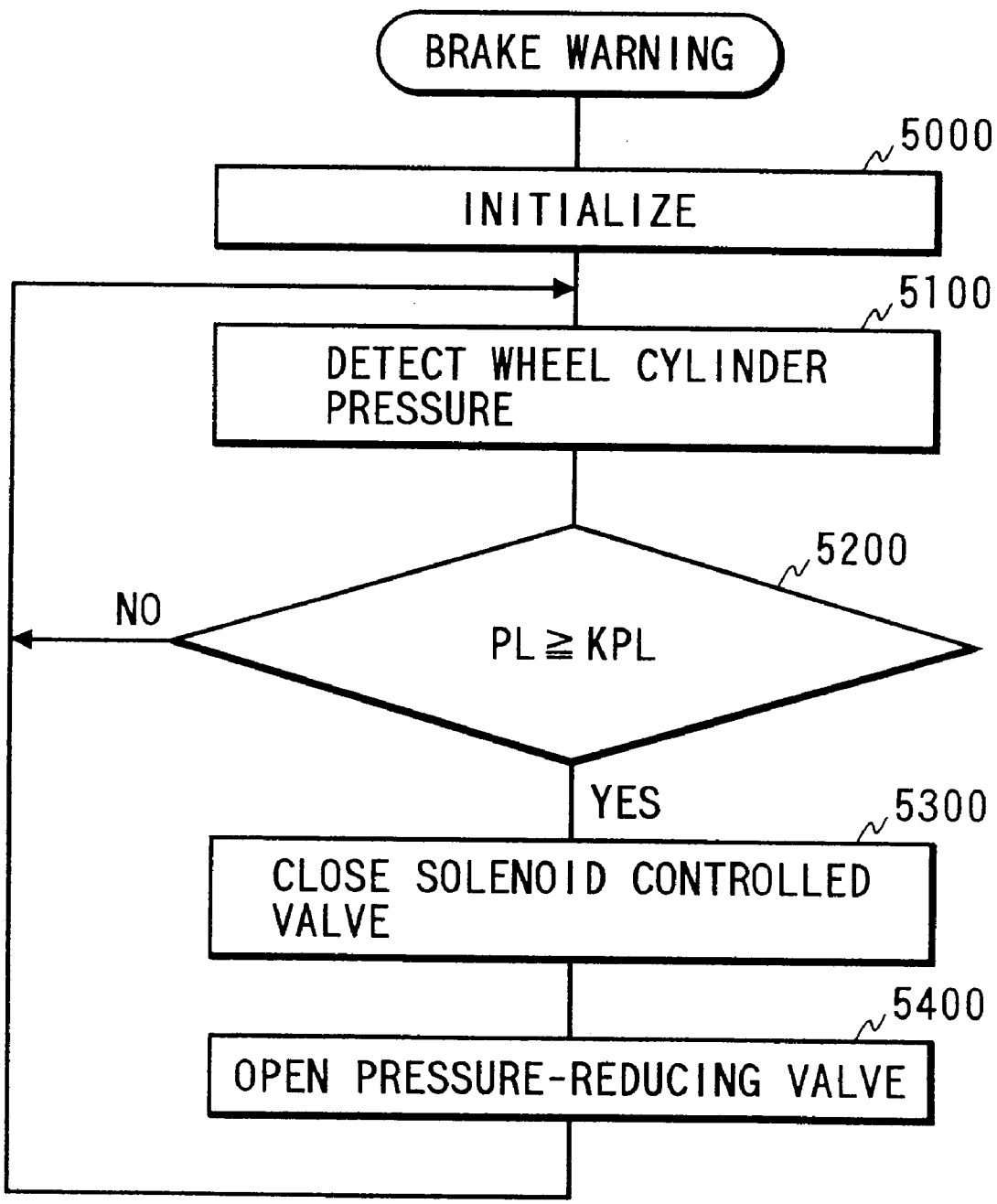
FIG. 27 is a flowchart of a brake warning program performed by the braking system of FIG. 26.

FIG. 27 shows a flowchart of a brake warning program of this embodiment performed by the ECU 50 based on the hydraulic pressure within the wheel cylinder 4.

After entering the program, the routine proceeds to step 5000 wherein given control parameters are initialized.

The routine proceeds to step 5100 wherein the hydraulic pressure PL acting on the wheel cylinder 4 is determined based on a signal from the wheel cylinder pressure sensor 27.

The routine proceeds to step 5200 wherein it is determined whether the wheel cylinder pressure PL determined in step 5100 is greater than or equal to a reference pressure level KPL or not. If a NO answer is obtained, then the routine returns back to step 5100. Alternatively, if a YES answer is obtained meaning that the wheel cylinder pressure PL is too great to produce an optimum braking force, then the routine proceeds to step 5300.

Usually, determination of whether the hydraulic pressure acting on the wheel cylinder 4 is at a suitable brake pressure level or not depends largely on the nature and conditions of the road. It is thus advisable that the reference pressure level KPL be changed according to the road conditions. For example, when the road-tire adhesion $\mu$ is greater, the reference pressure level KPL may be increased because a smaller wheel slippage should occur even if the wheel cylinder pressure PL Is relatively high. Conversely, when the road-tire adhesion $\mu$ is smaller, the reference pressure level KPL may be decreased.

In step 5300, the solenoid controlled valve 41 is turned on to block the fluid communication between itself and the wheel cylinder 4 to hold the wheel cylinder pressure PL as is.

The routine proceeds to step 5400 wherein the pressure-reducing valve 302 is turned on to establish the fluid communication between the line A1 and the line A2 to drain the brake fluid within the line A1 into the brake fluid reservoir 200, thereby reducing the hydraulic pressure within the master cylinder 5 for decreasing the reaction force against the pedal effort by the vehicle operator. The decrease in reaction force, like the above embodiments, informs the vehicle operator that the road-tire adhesion limit is being approached or has been reached before the wheels are locked.

The braking system of this embodiment reduces the hydraulic pressure within the master cylinder 5 while holding the hydraulic pressure within the wheel cylinder 4 as is and thus is suitable for a system designed to regulate hydraulic braking pressures in wheel cylinders more accurately and independently.

Figure 28:
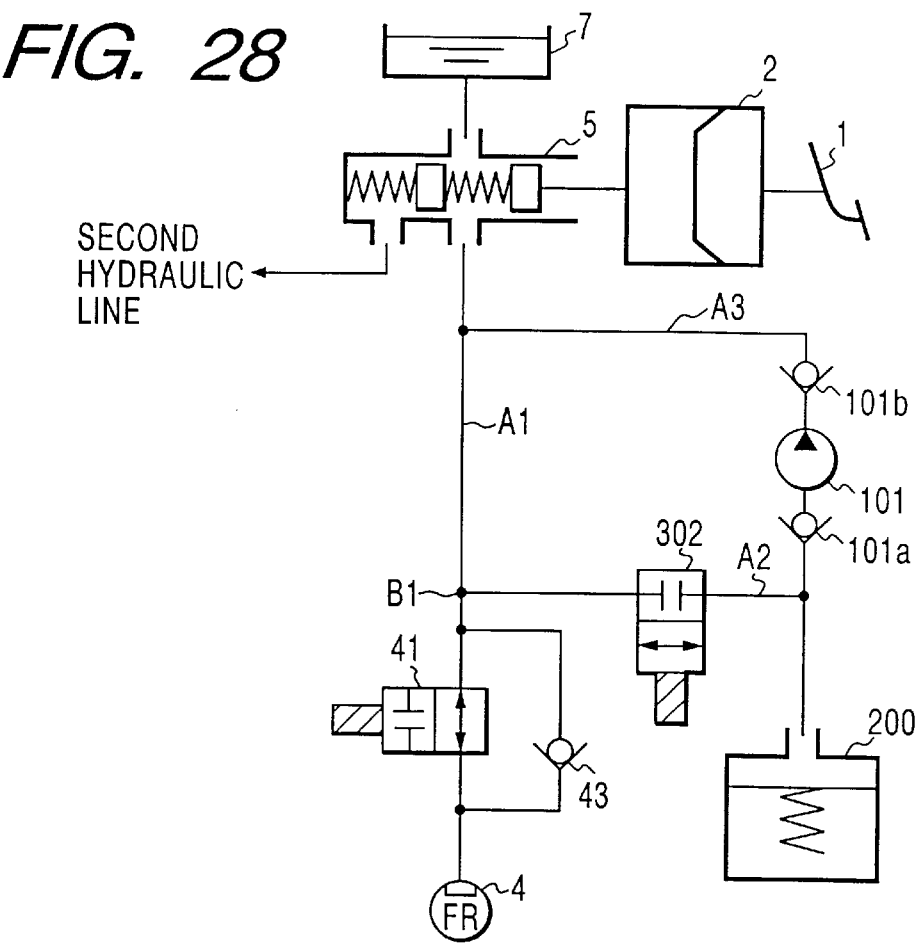
FIG. 28 is a hydraulic circuit diagram which shows a modification of the braking system of FIG. 26.

FIG. 28 shows a modification of the braking system of the eighth embodiment in FIG. 26 which includes a pump 101 and check valves 110a and 101b. The pump 101 and the check valves 110a and 101b are identical in structure, operation, and effect with those shown in FIG. 19, and explanation thereof in detail will be omitted here.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

The braking system of the invention is, as described above, used with the front drive vehicle having the so-called X type dual circuit, however, may be used with a rear drive vehicle, a two-wheeled vehicle, and a vehicle having a front-rear dual circuit.

Figure 29:
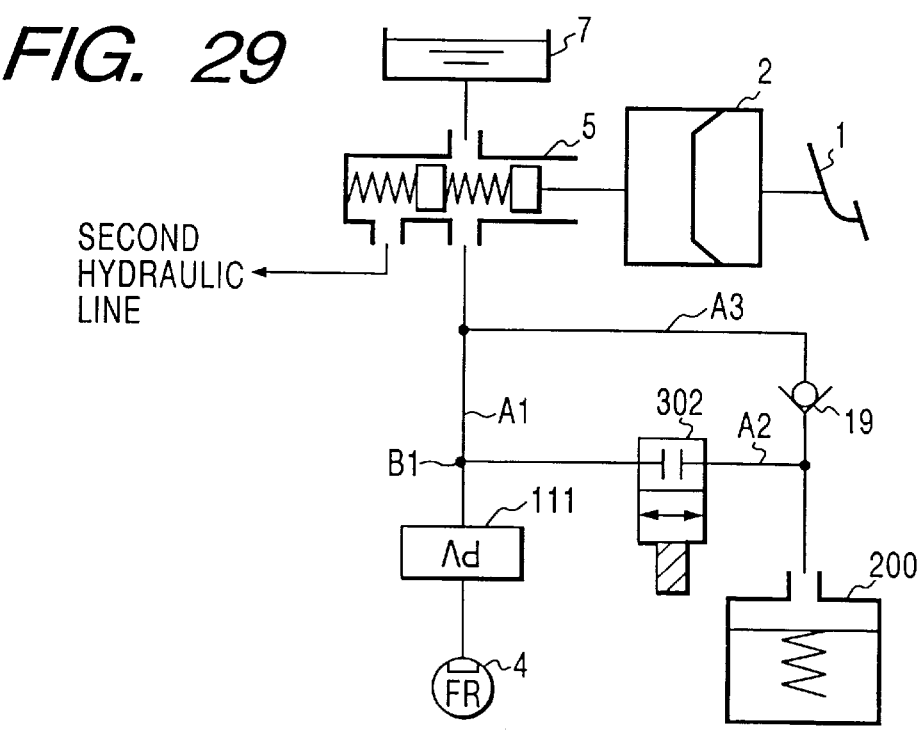
FIG. 29 is a hydraulic circuit diagram which shows a braking system including a combination of the above embodiments.

The solenoid controlled valve 41 and the check valve 43, as used in the sixth and eighth embodiments, may be replaced with a proportional control valve. Taking as an example the eighth embodiment, a proportional control valve Ill which is usually used in preventing the rear wheel from being locked earlier than the front wheel may be, as shown in FIG. 29, disposed between the wheel cylinder 4 and the junction B1 of the master cylinder 5 and the inlet of the pressure-reducing valve 302. The proportional control valve 111 operates, as described above, to produce a pressure difference between the wheel cylinder 4 and the line A1 so that the hydraulic pressure within the wheel cylinder 4 is held greater than that within line A1. Specifically, the hydraulic pressure within the wheel cylinder 4 drops in proportional to a reduction in master cylinder pressure, but at a rate lower than that of the hydraulic pressure within the line A1. This reduces the effect of reduction in master cylinder pressure on the wheel cylinder 4.

The braking systems, as discussed in the third to eighth embodiments, are designed to reduce the master cylinder and warn the vehicle operator of proximity to the road-tire adhesion limit, however, this warning may alternatively be achieved by supplying a high pressure to the master cylinder using, for example, a pump or an accumulator to produce a change in master cylinder pressure.

The braking systems, as discussed in third to sixth embodiments, are operable to warn the vehicle operator that the road-tire adhesion limit is being approached or has been reached and the system will enter the antiskid brake control soon, however, they may be designed to inform the vehicle operator of proximity to the road-tire adhesion limit during turns.

The wheel deceleration may be used in determining whether the road-tire adhesion limit has been reached or is being approached. For example, when the wheel deceleration is monitored, and a great change in wheel deceleration is detected, the system may determine that a controlled wheel is near the road-tire adhesion limit and inform the vehicle operator of this determination. The determination of proximity to the road-tire adhesion limit may be made by checking whether the wheel deceleration exceeds a given value or not.

The use of the wheel deceleration in determination of proximity to the road-tire adhesion limit allows road conditions to be determined more easily and accurately than using a slip ratio determined based on the vehicle speed that is usually difficult to calculate.

The braking system of the invention may include a combination of two or more of the above described embodiments. The improvement on braking comfort is achieved by arranging the order of execution of control operations. For example, when it is determined that the road-tire adhesion limit is being approached or has been reached, the master cylinder pressure is reduced to warn the vehicle operator of proximity to the road-tire adhesion limit, the pump 101 is turned on simultaneously or after a lapse of a given period of time, and a two-position control valve is closed several milliseconds or several tens of milliseconds after the brake fluid is actually delivered by the pump to block the fluid flow from the wheel cylinders to the master cylinder. The two-position control valve may be replaced with a proportional control valve.

What is claimed is:

1. A braking system comprising:

an operating member pressed by a vehicle operator for applying a braking effort to a wheel;

hydraulic braking pressure generating means for generating a hydraulic braking pressure according to a pressing effort provided by the vehicle operator to said operating member;

braking force generating means for generating a braking force acting on a wheel of the vehicle according to the hydraulic braking pressure provided from said hydraulic braking pressure generating means, a hydraulic pressure line connecting said hydraulic braking pressure generating means and said braking force generating means;

a braking condition determining circuit determining whether or not the wheel lies within a given friction limit range including a limit of friction between a road surface and the wheel at which the wheel rotates on the road surface without skidding; and a warning circuit reducing a hydraulic reaction force produced in said hydraulic braking pressure generating means against the pressing effort provided to said operating member by the vehicle operator for warning the vehicle operator of proximity to the limit of the friction when said braking condition determining circuit determines that the wheel lies within the given friction limit range, wherein said warning circuit drains and a reservoir stores the hydraulic braking pressure out of said hydraulic pressure line to reduce the hydraulic reaction force against the braking effort provided by the vehicle operator; and said pressure regulating mechanism includes a pressure rise-controlling valve which is actuated to transmit the hydraulic braking pressure provided from said hydraulic braking pressure generating means to said braking force generating means and a pressure reducing valve which is actuated to drain the hydraulic braking pressure out of said hydraulic pressure line into said reservoir, and wherein said warning circuit actuates the pressure reducing valve to reduce the hydraulic reaction force against the braking effort provided by the vehicle operator.

2. A braking system comprising:

an operating member pressed by a vehicle operator for applying a braking effort to a wheel;

hydraulic braking pressure generating means for generating a hydraulic braking pressure according to a pressing effort provided by the vehicle operator to said operating member;

braking force generating means for generating a braking force acting on a wheel of the vehicle according to the hydraulic braking pressure provided from said hydraulic braking pressure generating means;

a hydraulic pressure line connecting said hydraulic braking pressure generating means and said braking force generating means;

a braking condition determining circuit determining whether or not the wheel lies within a given friction limit range including a limit of friction between a road surface and the wheel at which the wheel rotates on the road surface without skidding; and a warning circuit reducing a hydraulic reaction force produced in said hydraulic braking pressure generating means against the pressing effort provided to said operating member by the vehicle operator for warning the vehicle operator of proximity to the limit of the friction when said braking condition determining circuit determines that the wheel lies within the given friction limit range, wherein said hydraulic pressure line is filled with a brake fluid, and said braking system further comprises a differential pressure regulating portion of said hydraulic pressure line connecting with said braking force generating means and producing a pressure difference between the first and second portions of said hydraulic pressure line so that hydraulic pressure within in the second portion is higher than that within the first portion, said pressure amplifying mechanism being actuated to drain the brake fluid out of the first portion of said hydraulic pressure line and delivering the drained brake fluid to the second portion of said hydraulic pressure line to amplify the hydraulic braking pressure in the second portion, and wherein said warning circuit actuates said pressure amplifying mechanism to reduce the hydraulic reaction force produced in said hydraulic braking pressure generating means against the braking effort provided by the vehicle operator.

3. A braking system as set forth in claim 2, further comprising second braking force generating for generating a braking force acting on a second wheel of the vehicle according to hydraulic braking pressure provided thereto, and wherein said pressure amplifying mechanism is actuated to delivery the drained brake fluid to the second portion of said hydraulic pressure line to increase the hydraulic braking pressure acting on said second braking force.

4. A braking system as set forth in claim 2, wherein the determination of whether the wheel lies within the given friction limit range or not is made based on a slippage of the wheel.

* * * * *